US012764700B2

(12) United States Patent
Hirzallah et al.

(10) Patent No.: US 12,764,700 B2
(45) Date of Patent: Oct. 13, 2026

(54) POSITIONING MODEL CAPABILITY CONFIGURATION

(71) Applicant: QUALCOMM Incorporated, San Diego, CA (US)

(72) Inventors: Mohammed Ali Mohammed Hirzallah, San Diego, CA (US); Srinivas Yerramalli, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 18/189,144

(22) Filed: Mar. 23, 2023

(65) Prior Publication Data

US 2024/0323891 A1 Sep. 26, 2024

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC .... H04W 64/00; H04W 64/02; H04L 5/0051; G01S 5/0236
USPC ............. 455/456.1, 422, 440; 340/988, 996; 342/450
See application file for complete search history.

(56) References Cited

U.S. PATENT DOCUMENTS

2024/0295625 A1* 9/2024 Hasegawa ............. G01S 5/0263

FOREIGN PATENT DOCUMENTS

WO 2022155244 A2 7/2022

OTHER PUBLICATIONS

Ericsson: "Other Aspects of AI/ML Based Positioning Enhancement", 3GPP TSG-RAN WG1 Meeting #110bis-e, Tdoc R1-2208400, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 12 Pages, XP052276325, paragraph [0001], paragraph [2.2.1]-paragraph [2.2.2], paragraph [2.3.1].
International Search Report and Written Opinion—PCT/US2024/020383—ISA/EPO—Jul. 15, 2024.

(Continued)

*Primary Examiner* — Juan A Torres
(74) *Attorney, Agent, or Firm* — Procopio, Cory, Hargreaves & Savitch LLP

(57) ABSTRACT

A wireless device may measure a set of positioning signals. The wireless device may calculate a set of estimated positioning results using a positioning model based on the measured set of positioning signals. The wireless device may obtain a set of verified positioning labels associated with the set of estimated positioning results. The wireless device may calculate a set of positioning model capability metrics based on the set of estimated positioning results and the set of verified positioning labels. The wireless device may output an indication of the calculated set of positioning model capability metrics. A network entity may transmit a request for the wireless device to indicate its support for calculating a set of positioning results using a positioning model. The network entity may receive, based on the request, a response including the set of positioning model capability metrics from the wireless device.

30 Claims, 14 Drawing Sheets

(56) References Cited

OTHER PUBLICATIONS

Moderator (Vivo): “FL Summary #2 of Other Aspects on AI/ML for Positioning Accuracy Enhancement”, 3GPP TSG RAN WG1 Meeting #110, R1-2207880, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 28, 2022, 42 Pages, XP052275811, paragraph [0001]-paragraph [02.2], paragraph [03.3]-paragraph [3.3.1].

Pan X (Vivo)., et al., “Evaluation on AI/ML for Positioning Accuracy Enhancement”, 3GPP TSG RAN WG1 #112, R1-2300448, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 81 Pages, XP052247592, paragraph [03.1], paragraph [0007], paragraph [07.2]-paragraph [7.2.1].

* cited by examiner

200
One Frame (TDD) 10 ms
subframe
slot
RB
subcarrier
OFDM symbol
DMRS R
CSI-RS

230
PDCCH CORESET
SSS
PSS
PDSCH
PBCH
REG 12 REs
1 CCE = 6 REGs
SS/PBCH Block
BWP
20 RBs
channel bandwidth RBs 250
SRS
SRS Comb 0
SRS Comb 1

280
PUCCH
PUSCH

POSITIONING MODEL CAPABILITY CONFIGURATION

TECHNICAL FIELD

The present disclosure relates generally to communication systems, and more particularly, to a wireless system for using positioning models to perform positioning of wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The wireless device may be a user equipment (UE) or a network node. The apparatus may receive a set of positioning signals. The apparatus may measure a set of positioning signals. The apparatus may calculate a set of estimated positioning results using a positioning model based on the measured set of positioning signals. The apparatus may obtain a set of verified positioning labels associated with the set of estimated positioning results. The apparatus may calculate a set of positioning model capability metrics based on the set of estimated positioning results and the set of verified positioning labels. The apparatus may output an indication of the calculated set of positioning model capability metrics.

In an aspect of the disclosure, a method, a computer-readable medium, and an apparatus are provided. The apparatus may include a network entity. The network entity may include a location management function (LMF). The apparatus may transmit a request for a wireless device to indicate its support for calculating a set of positioning results using a positioning model. The apparatus may receive, based on the request, a response including a set of positioning model capability metrics. The apparatus may configure a set of positioning signals based on the set of positioning model capability metrics.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
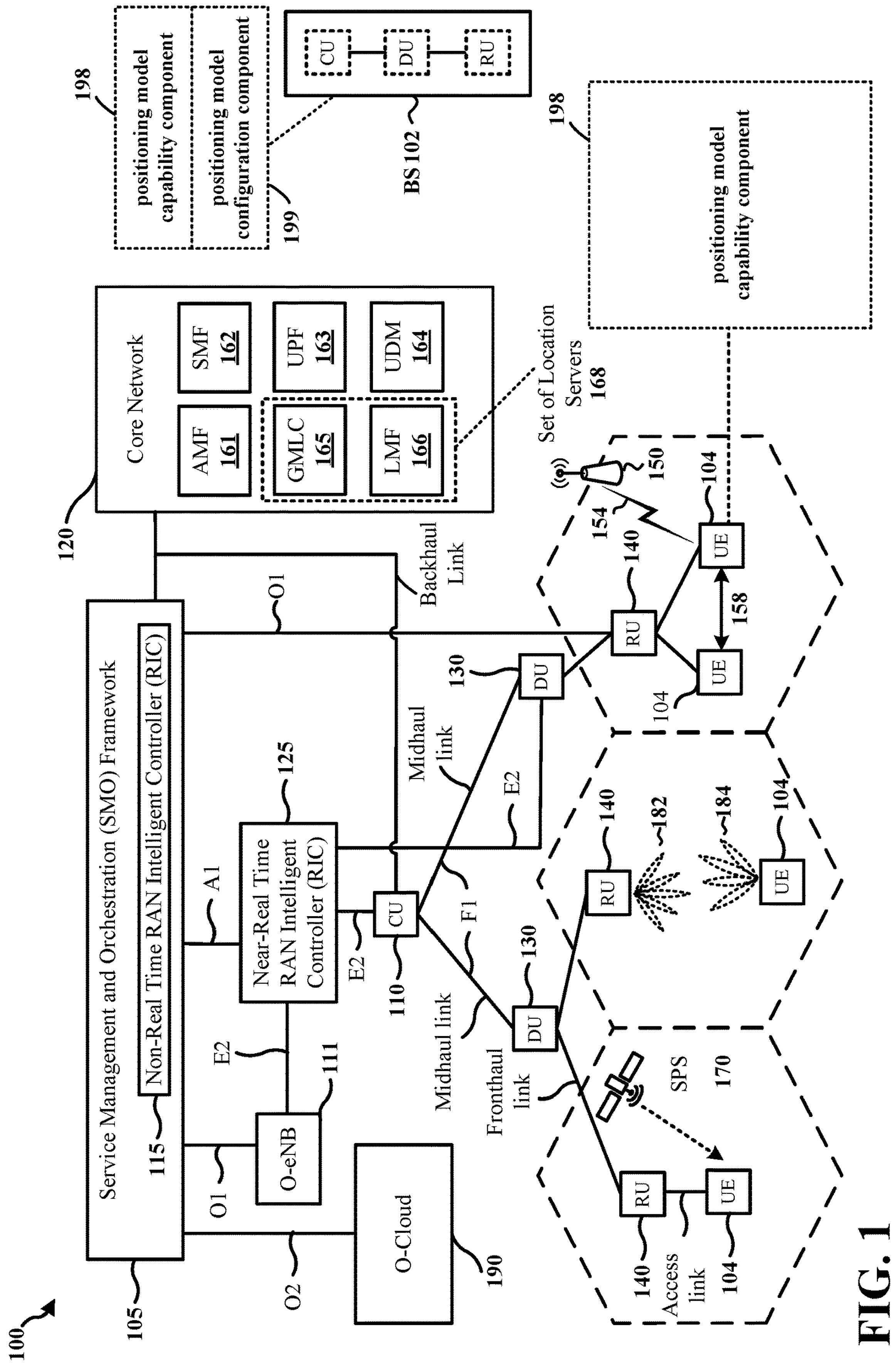
FIG. 1 is a diagram illustrating an example of a wireless communications system and an access network.

Various aspects relate generally to a positioning model system. Some aspects more specifically relate to a network entity configured to configure positioning signals based on positioning model capability of one or more wireless devices that may use positioning models to calculate positioning results. In some examples, the wireless devices may calculate positioning model capability metrics of positioning models the wireless devices may use to provide contextual feedback to the network entity. The positioning model may be an artificial intelligence machine learning (AIML or AI/ML) positioning model trained using a set of inputs and a set of labels (i.e., expected outputs) that may be used to calculate outputs based on a set of inputs after the positioning model has been trained.

One or more wireless devices may be configured to perform positioning. For example, positioning signals may be exchanged between a positioning target wireless device with an unknown location and a set of positioning neighbor wireless devices with known locations. Based on measurements of the positioning signals, the wireless devices may calculate a positioning result, for example a location of the positioning target wireless device, or an intermediate measurement that may be used to calculate or estimate the location of the positioning target wireless device. An intermediate measurement may include, for example, an angle of arrival (AoA), a time-difference of arrival (TDOA), a line-of-sight (LOS) identification (e.g., an indication of whether a line-of-sight between a first wireless device and a second wireless device is blocked), a time of arrival (ToA) reference signal time difference (ToA RSTD), an angle of departure (AoD), an angle of arrival (AoA), a reference signal received power (RSRP), and/or a reference signal received power path (RSRPP). One or more of the wireless devices may use one or more positioning models to calculate or estimate the positioning results based on one or more measurements of the positioning signals. The complexity and/or accuracy of the positioning models may depend on the number of positioning resources and their configurations considered for positioning. However, not all wireless devices may be configured to provide such complexity and/or accuracy information to the network entity configuring positioning for the wireless devices.

In some aspects, a wireless device may measure a set of positioning signals. The wireless device may calculate a set of estimated positioning results using a positioning model based on the measured set of positioning signals. The wireless device may obtain a set of verified positioning labels associated with the set of estimated positioning results. The wireless device may calculate a set of positioning model capability metrics based on the set of estimated positioning results and the set of verified positioning labels. The wireless device may output an indication of the calculated set of positioning model capability metrics. A network entity may transmit a request for the wireless device to indicate its support for calculating a set of positioning results using a positioning model. The network entity may receive, based on the request, a response including the set of positioning model capability metrics from the wireless device.

Particular aspects of the subject matter described in this disclosure can be implemented to realize one or more of the following potential advantages. In some examples, by providing positioning model capability metrics to a network entity configuring positioning, a wireless device may be configured to measure signals optimized for one or more positioning models of the wireless device. The described techniques can be used to optimize configurations for positioning signals based the capabilities of the positioning models available to a wireless device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 1002.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN). The base station 102 may include one or more components of the core network 120, such as the LMF 166, or the set of location servers 168.

The core network 120 may include an Access and Mobility Management Function (AMF) 161, a Session Management Function (SMF) 162, a User Plane Function (UPF) 163, a Unified Data Management (UDM) 164, set of location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The set of location servers 168 are illustrated as including a Gateway Mobile Location Center (GMLC) 165 and a Location Management Function (LMF) 166. However, generally, the set of location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 or the base station 102 may have a positioning model capability component 198 that may be configured to measure a set of positioning signals. The positioning model capability component 198 may be configured to calculate a set of estimated positioning results using a positioning model based on the measured set of positioning signals. The positioning model capability component 198 may be configured to obtain a set of verified positioning labels associated with the set of estimated positioning results. The positioning model capability component 198 may be configured to calculate a set of positioning model capability metrics based on the set of estimated positioning results and the set of verified positioning labels. The positioning model capability component 198 may be configured to output an indication of the calculated set of positioning model capability metrics. In certain aspects, the base station 102 may have a positioning model configuration component 199 that may be configured to transmit a request for a wireless device to indicate its support for calculating a set of positioning results using a positioning model. The positioning model configuration component 199 may be configured to receive, based on the request, a response including a set of positioning model capability metrics. The positioning model configuration component 199 may be configured to configure a set of positioning signals based on the set of positioning model capability metrics. The base station 102 may include the LMF 166 and/or at least one of the set of location servers 168. In other words, the positioning model capability component 198 may determine how accurate the positioning model is based on the estimated positioning results calculated using the positioning model and the verified positioning labels which are presumably accurate. The positioning model's accuracy may be quantified in the calculated set of positioning model capability metrics. The positioning model capability component 198 may transmit an indication of the calculated set of positioning model capability metrics to a positioning model configuration component 199, which may use the metrics to configure the positioning model.

Figures 2A, 2B, 2C, 2D:
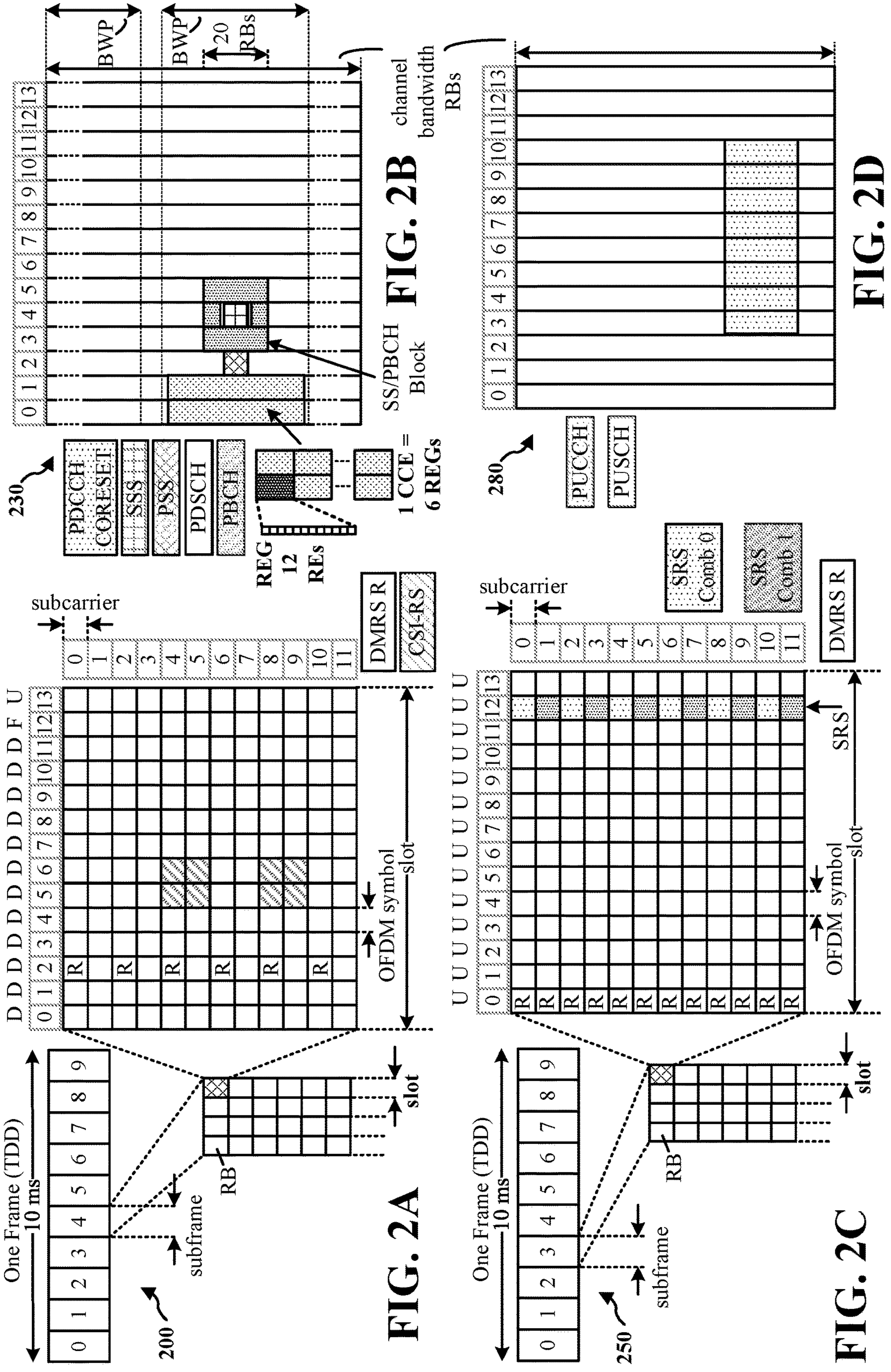
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
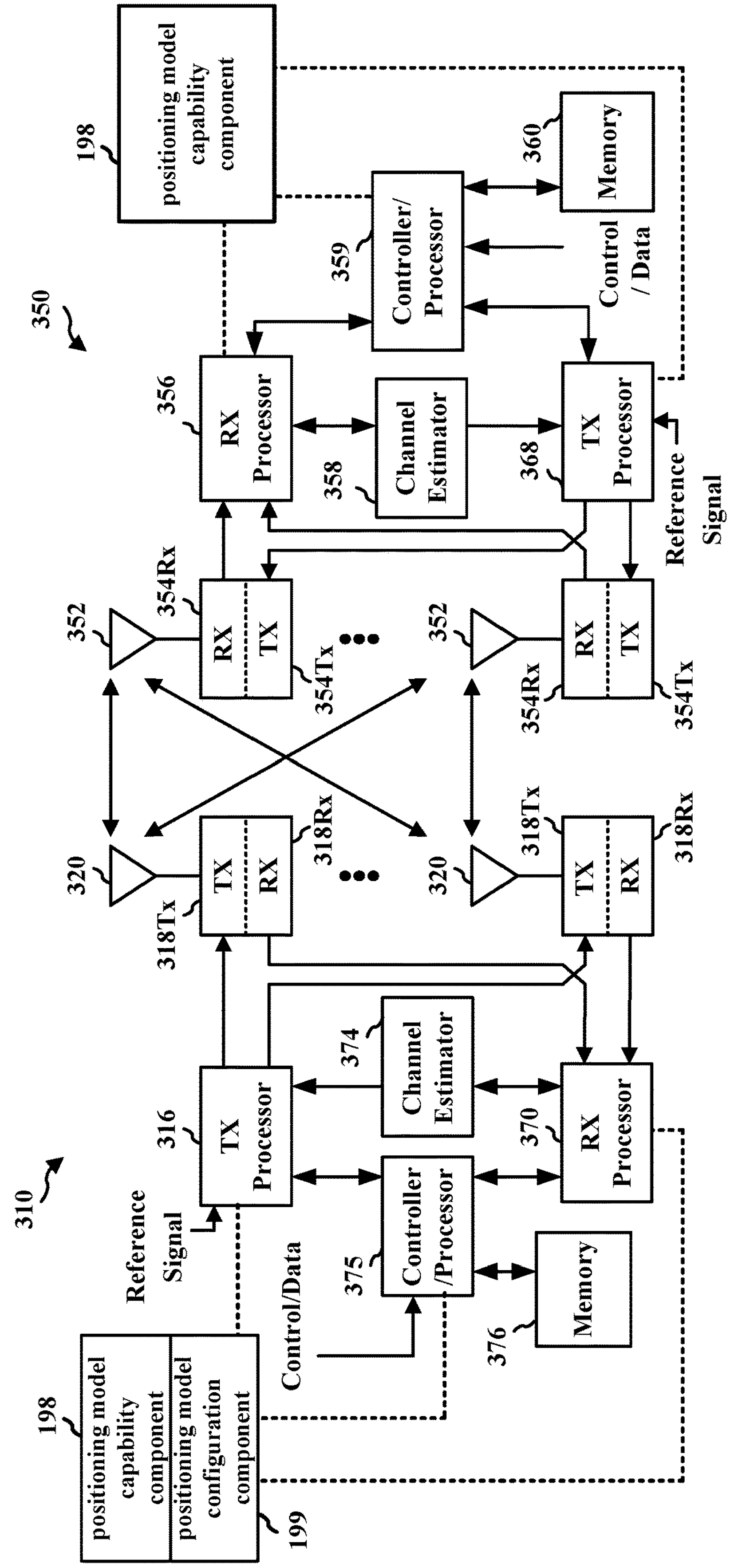
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning model capability component 198 of FIG. 1.

At least one of the TX processor 316, the RX processor 370, and the controller/processor 375 may be configured to perform aspects in connection with the positioning model capability component 198 of FIG. 1.

At least one of the TX processor 316, the RX processor 370, and the controller/processor 375 may be configured to perform aspects in connection with the positioning model configuration component 199 of FIG. 1.

Figure 4:
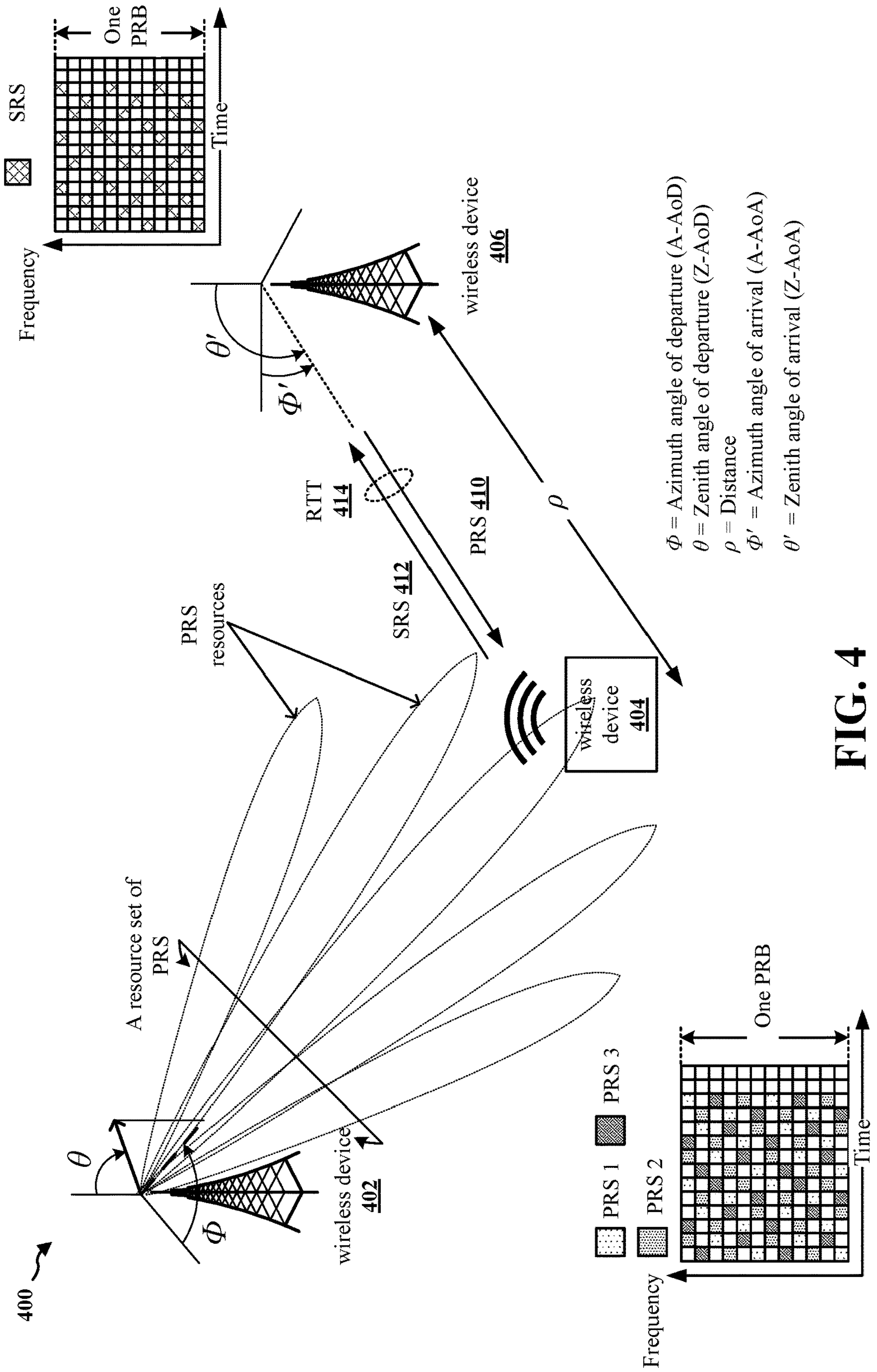
FIG. 4 is a diagram illustrating an example of positioning based on reference signal measurements.

FIG. 4 is a diagram 400 illustrating an example of positioning based on reference signal measurements. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS}$_TX to the wireless device 406. The wireless device 404 may receive positioning reference signals (PRS) 410 at time $T_{PRS}$_RX from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., location server(s) 168), the wireless device 404, or the wireless device 406 may determine the round-trip-time (RTT) 414 based on $$||T_{SRS\_RX}-T_{PRS\_TX}|-|T_{SRS\_TX}-T_{PRS\_RX}||.$$

Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_Tx}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

Figure 5:
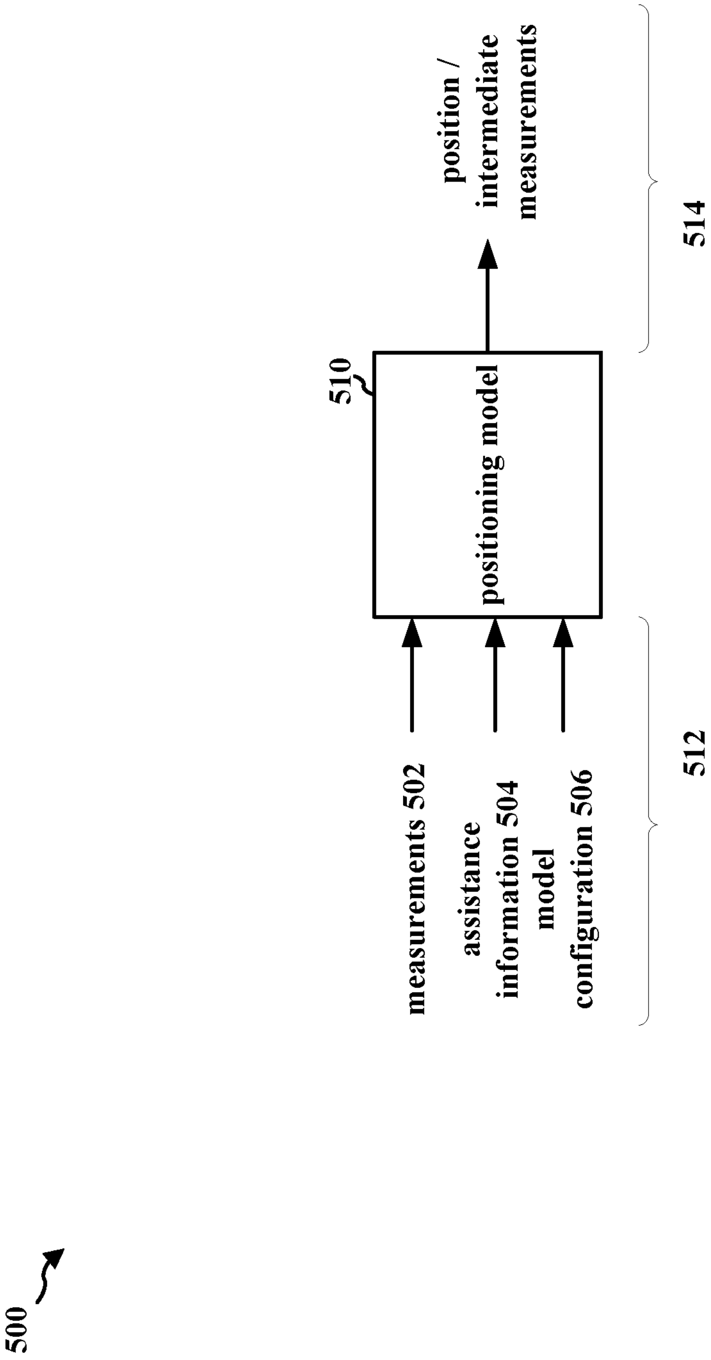
FIG. 5 is a diagram illustrating an example of a positioning model used to calculate positioning outputs based on a set of positioning inputs.

FIG. 5 is a diagram 500 illustrating an example of a positioning model 510 used to calculate a set of positioning outputs 514 based on a set of positioning inputs 512. The positioning outputs may include a position of a positioning target wireless device, such as the wireless device 404 in FIG. 4. The positioning outputs may include intermediate measurements that may be used to calculate a position of a positioning target wireless device. An intermediate measurement may include, for example, an AoA, a TDOA, or a line-of-sight (LOS) identification (e.g., an indication of whether a line-of-sight between a first wireless device and a second wireless device is blocked). The positioning inputs may include a set of measurements 502, for example measurements of a set of PRSs transmitted by a TRP or measurements of a set of SRSs transmitted by a UE. The positioning inputs may include assistance information 504 associated with the positioning signals, for example configuration information for the positioning signals, position information associated with network nodes transmitting the positioning signals, beam information, and/or angle information. The positioning inputs may include a model configuration 506 for the positioning model 510. The model configuration 506 may include one or more configurable parameters for the positioning model 510, for example a requested accuracy range or a set of positioning resources that may be used by the positioning model 510.

A wireless device, such as a UE or a base station, may use a set of positioning models, such as the positioning model 510 to estimate, or calculate, a set of positioning outputs 514 associated with a positioning target wireless device based on a set of positioning inputs 512, such as measurements of positioning signals received by the wireless device and, in some aspects, assistance information associated with the positioning signals. The positioning outputs 514 may include a location of the positioning target wireless device, such as the wireless device 404, or may include an intermediate measurement that may be used to calculate or otherwise derive the location of the positioning target wireless device. The positioning model 510 may be generated using artificial intelligence machine learning (AIML) to train the positioning model based on a set of inputs (e.g., measurements of one or more reference signals transmitted from, or received by, the positioning target wireless device) and a set of expected labels (e.g., a location of the positioning target wireless device, an AoA of a reference signal received by the positioning target wireless device). The positioning model 510 may perform AIML direct positioning (calculating a location of a positioning target wireless device) based on a set of inputs, such as measurements of positioning signals received by the wireless device and, in some aspects, assistance information associated with the positioning signals. The positioning model 510 may perform AIML assisted positioning (calculating an intermediate measurement) based on a set of inputs, such as measurements of positioning signals received by the wireless device, assistance information associated with the positioning signals, and/or configuration parameters for the positioning model 510.

The complexity and accuracy of the positioning model 510 may depend upon a number of positioning resources and their configurations used for positioning. In order to configure the positioning model 510, or select the positioning model 510 from a set of positioning models, a wireless device may configure the positioning model 510 or select the positioning model 510 from a set of positioning models based on a set of capability metrics (e.g., model complexity, model latency, model accuracy). The set of positioning model capability metrics may include an indicator of an accuracy of the positioning model 510, an indicator of a latency of the positioning model 510, and/or an indicator of a power consumption of the positioning model 510. In some aspects, a profile of the positioning model 510 may be generated by testing the positioning model 510 in a variety of environments, for example in a lab test. A configuration entity, such as an LMF or a location server, may use capability messaging and assistance data/assistance information to exchange positioning model accuracy quality, complexity, and resource configurations for positioning with wireless entities (e.g., UE, PRU, TRP, base station) performing positioning using the positioning model 510.

In some aspects, the accuracy of the positioning model 510 may be based on a set of implementation aspects, a set of configuration aspects, and/or a set of operation aspects. The set of implementation aspects may include the model complexity (e.g., the number of learnable parameters of the positioning model), the model structure, and/or the model design. The set of configuration aspects may include the bandwidth of the positioning signal resource, the number of positioning signal resources, and/or the diversity of the positioning signal resources. The set of operation aspects may include a multipath profile and/or a LOS/NLOS condition (e.g., whether or not there is a LOS path between the positioning target wireless device and a positioning neighbor wireless device). The accuracy of the positioning model 510 may be expressed as a numerical metric calculated as a function of at least some of the set of implementation aspects, the set of configuration aspects, and/or the set of operation aspects. In some aspects, the accuracy of the positioning model 510 may be expressed as a range of possible accuracies that the positioning model 510 may achieve.

In some aspects, the latency of the positioning model 510 may be based on the model complexity, the device capability, and/or the accuracy configuration (e.g., a parameter that controls how accurate the calculations are). A wireless device using the positioning model 510 may adjust the latency based on the accuracy configuration (e.g., a requested accuracy range, a set of positioning resources to be used for positioning). In some aspects, the power consumption of the positioning model 510 may be based on the model complexity, the device capability, and/or the accuracy configuration. A wireless device using the positioning model 510 may adjust the power consumption based on the accuracy configuration.

In some aspects, the positioning model 510 may be associated with a range of expected accuracy error, or a range of guaranteed accuracy error. This accuracy error range may represent the accuracy of the set of positioning outputs 514. An example of the range may be a 2% accuracy range. The accuracy range may be calculated as a function of a set of positioning configurations and a set of positioning operational conditions. The set of positioning configurations may include a positioning resource bandwidth, a number of positioning signal resources, and a diversity of positioning signal resources. The set of positioning operational conditions may include a set of composed multipath profiles. In some aspects, the positioning model 510 may be associated with a plurality of accuracy level ranges, where each accuracy level range is associated with a specific configuration and operation scenario combination. The range of accuracy may be estimated based on one or more lab testing setups that emulate such specific configuration and operation scenario combinations. In some aspects, the set of configuration and operation scenario combinations may be selected based on standardized specifications. The associated range of expected/guaranteed accuracy errors for the positioning model 510 may be used to indicate whether the positioning model 510 may support a given service level accuracy. As a result, a metric, such as a quality of service (QoS) metric, may be used to select a positioning model based on the requested accuracy level associated with the QoS metric.

In some aspects, the positioning model 510 may be associated with a range of inference latency. This latency range may represent the latency for the positioning model 510 to calculate the set of positioning outputs 514. An example of the latency may be two percentiles or may be 10 milliseconds. The latency range may be calculated as a function of a set of positioning configurations and a set of positioning operational conditions. In some aspects, the positioning model 510 may be associated with a plurality of latency level ranges, where each latency level range is associated with a specific configuration and operation scenario combination. The range of latency may be estimated based on one or more lab testing setups that emulate such specific configuration and operation scenario combinations. In some aspects, the set of configuration and operation scenario combinations may be selected based on standardized specifications. The associated range of inference latency for the positioning model 510 may be used to indicate whether the positioning model 510 may support a given service level latency. As a result, a metric, such as a QoS metric, may be used to select a positioning model based on a latency parameter associated with the QoS metric.

In some aspects, the positioning model 510 may be associated with a range of inference power consumption. This power consumption range may represent the power consumption for the positioning model 510 to calculate the set of positioning outputs 514. An example of the power consumption may be two percentiles of battery power, may be 15 mAh, or may be 1.2 dBmW. The power consumption range may be calculated as a function of a set of positioning configurations and a set of positioning operational conditions. In some aspects, the positioning model 510 may be associated with a plurality of power consumption level ranges, where each power consumption level range is associated with a specific configuration and operation scenario combination. The range of power consumption may be estimated based on one or more lab testing setups that emulate such specific configuration and operation scenario combinations. In some aspects, the set of configuration and operation scenario combinations may be selected based on standardized specifications. The associated range of inference power consumption for the positioning model 510 may be used to indicate whether the positioning model 510 may support a given service level power consumption. As a result, a metric, such as a QoS metric, may be used to select a positioning model based on a power consumption parameter associated with the QoS metric. A lower range of power consumption may be selected to support green positioning standards or considerations.

The set of capability metrics associated with the positioning model 510 may be derived by testing the positioning model 510 in a lab setup where the positioning model 510 is executed on a wireless device under test for profiling the latency, accuracy, and/or power consumption of the positioning model 510 while running on the wireless device. The wireless device may include a UE (e.g., a target UE) or a base station (e.g., an NG-RAN node). The wireless device may be tested using various permutations of a set of positioning configurations and a set of positioning scenarios for the wireless device. In one example, the wireless device may be tested with a set of positioning configurations represented by C={c1, c2, . . . , cm}. Each configuration C may include a channel bandwidth value (e.g., 5 MHz, 20 MHz, 40 MHz, 50 MHz, 100 MHz, 400 MHz), a PRS configuration, an SRS configuration, a number of TRPs transmitting positioning signals, a maximum number of frequency layers, and/or a frequency band indicator. The wireless device may also be tested with a set of positioning scenarios/operation scenarios represented by S={s1, s2, . . . , sn}. Each scenario S may include a channel indicator (e.g., one tap channel, two taps channel), an environment indicator (e.g., indoor factory (InF) urban micro (UMi), urban macro (Uma)), and/or a set of channels associated with an environment (e.g., InF channels, UMi channels, Uma channels). The positioning model 510 may then be tested using every permutation using the wireless device by testing on loop for each scenario in S, and each configuration in C. Each test may include a positioning test which records the accuracy, inference latency, and/or power consumption of the positioning model 510 for each scenario. The positioning model 510 may be associated with a range of accuracy, range of latency, and/or range of power consumption based on the results, or may be associated with a mapping of accuracy, latency, and power consumption metrics associated with a configuration/scenario combination (see Table 2).

TABLE 2

| scenario | configuration | realization/ localization | accuracy [m] | latency [ms] | power consumption (dBmW) |
|---|---|---|---|---|---|
| 2-taps channel | 100 MHz PRS, 8x TRPs | loc1 | 0.2 | 102 | 2 |
| 2-taps channel | 100 MHz PRS | loc2 | 0.8 | 98 | 1.5 |
| . . . | . . . | . . . | . . . | . . . | . . . |
| InF-DH (clutter {60%, 60, 2}) | 40 MHz PRS, 12 TRPs | loc1 | 1.3 | 60 | 0.6 |
| . . . | . . . | . . . | . . . | . . . | . . . |

Figure 6:
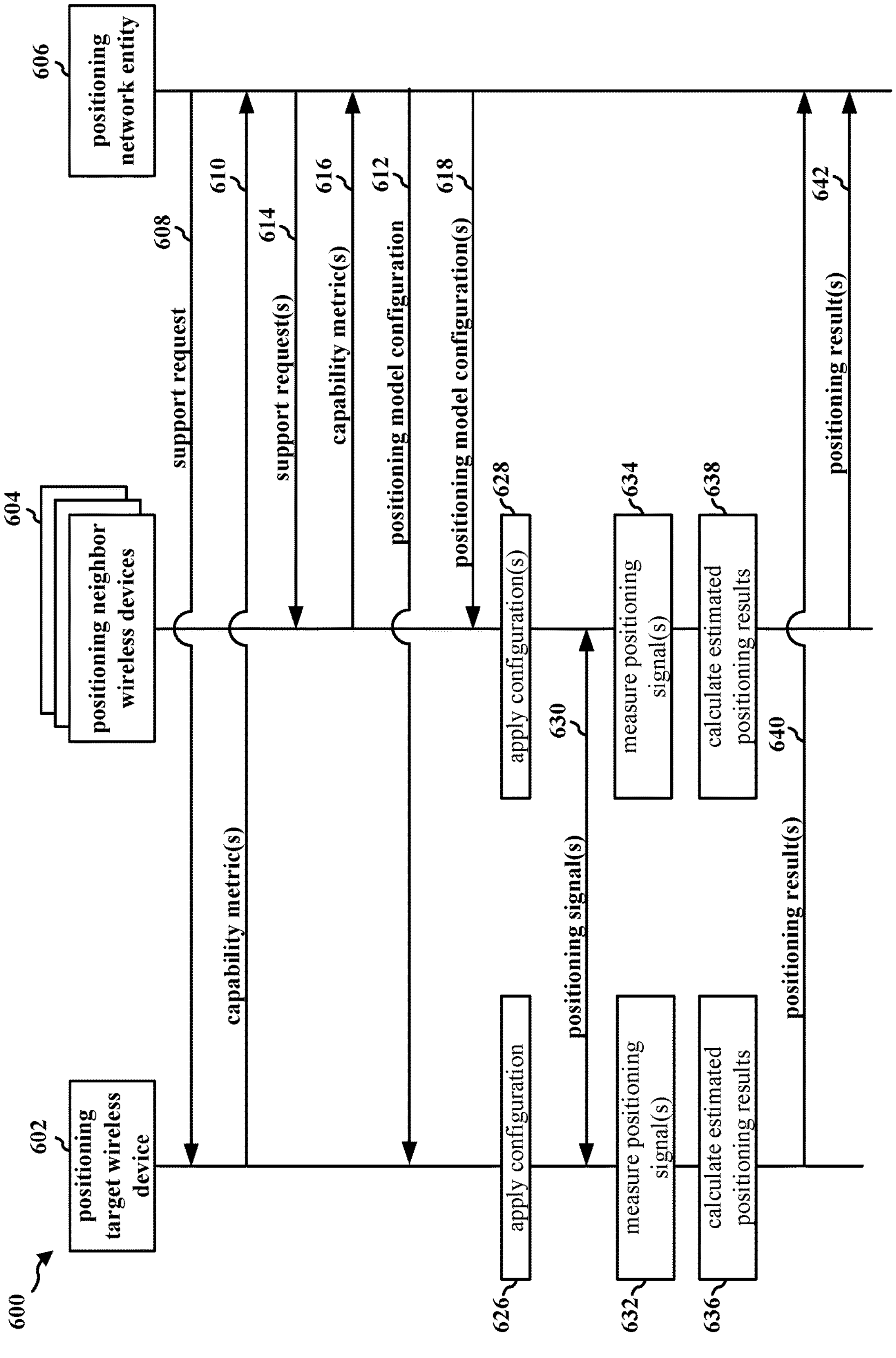
FIG. 6 is a connection diagram illustrating a positioning network entity that configures positioning signals for a positioning target wireless device and a set of positioning neighbor wireless devices based on positioning model capability metrics, in accordance with various aspects of the present disclosure.

FIG. 6 is a connection diagram 600 illustrating a positioning network entity 606 that configures positioning signals for a positioning target wireless device 602 and a set of positioning neighbor wireless devices 604. The positioning target wireless device 602 may include a UE or a network node, for example the UE 104 in FIG. 1 or the base station 102 in FIG. 1. The set of positioning neighbor wireless devices may include a set of UEs and/or a set of network nodes. The positioning network entity 606 may include a base station, or a component of a core network, for example the LMF 166 or the set of location servers 168 in FIG. 1.

In some aspects, the positioning network entity 606 may request the positioning target wireless device 602 to indicate its support for AIML direct positioning (calculating the location of the positioning target wireless device 602) or AIML assisted positioning (calculating an intermediate measurement that may be used to calculate the location of the positioning target wireless device 602). In some aspects, the positioning network entity 606 may request the positioning target wireless device 602 to indicate the accuracy, latency, and/or power consumption (or range thereof) associated with a set of positioning models associated with the positioning target wireless device 602. The positioning network entity 606 may request this as part of long term evolution (LTE) positioning protocol (LPP) annex (LPPa) capability messaging. In other words, the request and response may be part of the LPPa protocol, with LPPa requests transmitted from the positioning network entity 606 to the positioning target wireless device 602 and LPPa responses transmitted from the positioning target wireless device 602 to the positioning network entity 606. In response, the positioning target wireless device 602 may respond with a capability indication message that indicates its capability to conduct positioning using a positioning model.

In some aspects, the request may be a general request message with a best effort specification (e.g., no specific ranges for accuracy and latency levels). In some aspects, the request may be a general request message with a best effort specification for a given configuration (e.g., PRS configuration, BWP, number of TRPs). In some aspects, the request may be a request for a specified set of ranges (e.g., range of accuracy, range of latency, and/or range of power consumption). For example, the request may include a request for a positioning model capability having a positioning model accuracy of less than 1.5 meters on average and a latency of 50 ms on average. In some aspects, the request may be a request for a specified set of ranges for a given configuration.

In some aspects, the response may include a supported accuracy, latency, and/or power consumption level, or a range of supported accuracies, latencies, and/or power consumption levels associated with a set of positioning models that the positioning target wireless device 602 may use to perform positioning. In some aspects, the response may indicate whether the accuracy, latency, and/or power consumption levels indicated in the request are supported. In some aspects, the positioning target wireless device 602 may indicate one or more PRS configurations (e.g., BW, number of resources, number of TRPs) associated with the indicated accuracy, latency, and/or power consumption levels so that the positioning network entity 606 may configure a positioning session appropriate for the positioning model at the positioning target wireless device 602 to achieve the indicated accuracy, latency, and/or power consumption levels.

In some aspects, the positioning network entity 606 may request one or more of the set of positioning neighbor wireless devices 604 to indicate their support for AIML direct positioning (calculating the location of the positioning target wireless device 602) or AIML assisted positioning (calculating an intermediate measurement that may be used to calculate the location of the positioning target wireless device 602). In some aspects, the positioning network entity 606 may request the positioning neighbor wireless device to indicate the accuracy, latency, and/or power consumption (or range thereof) associated with a set of positioning models associated with the positioning neighbor wireless device. The positioning network entity 606 may request this as part of new radio (NR) positioning protocol (NRPP) annex (NRPPa) TRP information messaging. In other words, the request and response may be part of the NRPPa protocol, with NRPPa requests transmitted from the positioning network entity 606 to one or more of the set of positioning neighbor wireless devices 604 and NRPPa responses transmitted from one or more of the set of positioning neighbor wireless devices 604 to the positioning network entity 606. In response, the positioning neighbor wireless device may respond with a capability indication message that indicates its capability to conduct positioning using a positioning model.

In some aspects, the request may be a general request message with a best effort specification. In some aspects, the request may be a general request message with a best effort specification for a given configuration. In some aspects, the request may be a request for a specified set of ranges. In some aspects, the request may be a request for a specified set of ranges for a given configuration.

In some aspects, the response may include a supported accuracy, latency, and/or power consumption level, or a range of supported accuracies, latencies, and/or power consumption levels associated with a set of positioning models that the positioning neighbor wireless device may use to perform positioning. In some aspects, the response may indicate whether the accuracy, latency, and/or power consumption levels indicated in the request are supported. In some aspects, the positioning neighbor wireless device may indicate one or more SRS configurations (e.g., BW, number of resources, number of antenna ports) associated with the indicated accuracy, latency, and/or power consumption levels so that the positioning network entity 606 may configure a positioning session appropriate for the positioning model at the positioning neighbor wireless device to achieve the indicated accuracy, latency, and/or power consumption levels.

In some aspects, the accuracy levels included in the capability request may include a request to support a kth percentile of positioning error (e.g., $90^{th}$ percentile of horizontal error is less than or equal to one meter), or an average metric of positioning error (e.g., average positioning error is less than or equal to 1.5 meters). In some aspects, the accuracy levels included in the capability request may include a request to support a range of positioning errors between two percentiles and/or between two ranges (e.g., between $50^{th}$ percentile and $90^{th}$ percentile of horizontal error is between 0.4 and 1 meter). In some aspects, the accuracy levels included in the capability request may include a request to support a kth percentile of positioning error with a specified confidence level (e.g., $90^{th}$ percentile of horizontal error is less than or equal to 1 meter at a 95% confidence level, $50^{th}$ percentile of 3D error is 1.2 meter at a 95% confidence level), or an average metric of positioning error with a specified confidence level (e.g., average positioning error is less than or equal to 1.5 meters at an 80% confidence level). In some aspects, the accuracy levels included in the capability request may include a request to support a range of positioning errors between two percentiles and/or between two ranges with a specified confidence level (e.g., between $50^{th}$ percentile and $90^{th}$ percentile of horizontal error is between 0.4 and 1 meter at a 95% confidence level).

The accuracy level may be for any intermediate measurement that the positioning model may calculate. In one aspect, the accuracy level may be for an accuracy of identifying a LOS/NLOS condition, a range of such accuracy levels, and/or a likelihood for such accuracy levels. In one aspect, the accuracy level may be for an accuracy of an estimate of a ToA RSTD (e.g., in meters or nanoseconds), a range of such accuracy levels, and/or a likelihood for such accuracy levels. In one aspect, the accuracy level may be for an accuracy of an AoD (e.g., in degrees), a range of such accuracy levels, and/or a likelihood for such accuracy levels. In one aspect, the accuracy level may be for an accuracy of an AoA (e.g., in degrees), a range of such accuracy levels, and/or a likelihood for such accuracy levels. In one aspect, the accuracy level may be for an accuracy of an RSRP (e.g., in dBm), a range of such accuracy levels, and/or a likelihood for such accuracy levels. In one aspect, the accuracy level may be for an accuracy of an RSRPP (e.g., in dBm), a range of such accuracy levels, and/or a likelihood for such accuracy levels.

In some aspects, the latency levels included in the capability request may include a request to support a kth percentile of positioning latency (e.g., $90^{th}$ percentile of latency is less than or equal to 100 ms), or an average metric of positioning latency (e.g., average latency is less than or equal to 100 ms). In some aspects, the latency levels included in the capability request may include a request to support a range of latencies between two percentiles and/or between two ranges (e.g., between $50^{th}$ percentile and $90^{th}$ percentile of latency is between 20 to 100 ms). In some aspects, the latency levels included in the capability request may include a request to support a kth percentile of latency with a specified confidence level (e.g., $90^{th}$ percentile of latency is less than or equal to 100 ms at a 95% confidence level), or an average metric of latency with a specified confidence level (e.g., average latency is less than 100 ms at an 80% confidence level). In some aspects, the latency levels included in the capability request may include a request to support a range of latencies between two percentiles and/or between two ranges with a specified confidence level (e.g., between $50^{th}$ percentile and $90^{th}$ percentile of latency is between 20 to 100 ms at a 95% confidence level).

In some aspects, the power consumption levels included in the capability request may include a request to support a kth percentile of positioning power consumption (e.g., $90^{th}$ percentile of inferred power consumption is less than or equal to 1 dBm), or an average metric of power consumption (e.g., average inferred power consumption is less than or equal to 1 dBm). In some aspects, the power consumption levels included in the capability request may include a request to support a range of power consumption levels between two percentiles and/or between two ranges (e.g., between $50^{th}$ percentile and $90^{th}$ percentile of inferred power consumption is between 0.1 dBm to 1 dBm). In some aspects, the power consumption levels included in the capability request may include a request to support a kth percentile of power consumption with a specified confidence level (e.g., $90^{th}$ percentile of inferred power consumption is less than or equal to 1 dBm at a 95% confidence level, $50^{th}$ percentile of inferred power consumption is less than or equal to 1.2 dBm at a 95% confidence level), or an average metric of power consumption with a specified confidence level (e.g., average inferred power consumption is less than 1.2 dBm at an 80% confidence level). In some aspects, the power consumption levels included in the capability request may include a request to support a range of power consumption levels between two percentiles and/or between two ranges with a specified confidence level (e.g., between $50^{th}$ percentile and $90^{th}$ percentile of power consumption is between 0.1 dBm to 1 dBm at a 95% confidence level).

The wireless device responding to the request may represent the power consumption level and/or the latency level using a number of operational computations (e.g., tensor operations (TOP), floating point operations (FLOP), multiple-accumulate operations (MAC)) used to calculate the outputs of the positioning model.

The positioning network entity 606 may transmit a support request message 608 to the positioning target wireless device 602. The positioning target wireless device 602 may receive the support request message 608. In some aspects, the support request message 608 may be an LPPa message transmitted from the positioning network entity 606 to the positioning target wireless device 602. In other words, the positioning network entity 606 may transmit the request as part of LPPa capability messaging. The support request message 608 may include a request for the positioning target wireless device 602 to indicate its support to use a set of positioning models to calculate or estimate a set of estimated positioning results. The support request message 608 may also request the accuracy, latency, and/or power consumption associated with the supported models.

In response to receiving the support request message 608, the positioning target wireless device 602 may transmit the capability metric message 610 to the positioning network entity 606. The positioning network entity 606 may receive the capability metric message 610 from the positioning target wireless device 602. The positioning target wireless device 602 may transmit the capability metric message 610 as part of LPPa capability messaging. The capability metric message 610 may include a set of positioning model capability metrics associated with a set of positioning models that the positioning target wireless device 602 may use to calculate or estimate a set of estimated positioning results.

In response to receiving the capability metric message 610, the positioning network entity 606 may transmit a positioning model configuration message 612 to the positioning target wireless device 602 based on the capability metric message 610. The positioning target wireless device 602 may receive the positioning model configuration message 612. The positioning model configuration message 612 may include a configuration for the set of positioning signals 630. The configuration may be generated to satisfy a set of indicated positioning signal configuration conditions of the capability metric message 610. At 626, the positioning target wireless device 602 may apply the configuration to receive the set of positioning signals 630 from the set of positioning neighbor wireless devices 604.

The set of positioning neighbor wireless devices 604 may transmit the set of positioning signals 630 to the positioning target wireless device 602 based on the configuration. The positioning target wireless device 602 may receive the set of positioning signals 630 from the set of positioning neighbor wireless devices 604 based on the configuration. The set of positioning signals 630 may include a set of PRSs. At 632, the positioning target wireless device 602 may measure the set of positioning signals 630. The positioning model configuration message 612 may indicate one or more positioning models that the positioning target wireless device 602 may use to calculate or estimate the estimated positioning results. At 636, the positioning target wireless device 602 may calculate a set of estimated positioning results based on the measurements of the set of positioning signals 630 taken at 632. The positioning target wireless device 602 may use a set of positioning models to calculate the set of estimated positioning results based on the positioning model configuration message 612.

The positioning target wireless device 602 may transmit a set of positioning results 640 to the positioning network entity 606. The positioning network entity 606 may receive the set of positioning results 640 from the positioning target wireless device 602.

The positioning network entity 606 may transmit a support request message 614 to at least one of the set of positioning neighbor wireless devices 604. At least one of the set of positioning neighbor wireless devices 604 may receive the support request message 614. In some aspects, the support request message 614 may be an NRPPa message transmitted from the positioning network entity 606 to at least one of the set of positioning neighbor wireless devices 604. In other words, the positioning network entity 606 may transmit the request as part of NRPPa TRP information messaging. The support request message 614 may include a request for at least one of the set of positioning neighbor wireless devices 604 to indicate support to use a set of positioning models to calculate or estimate a set of estimated positioning results. The support request message 614 may also request the accuracy, latency, and/or power consumption associated with the supported models.

In response to receiving the support request message 614, at least one of the set of positioning neighbor wireless devices 604 may transmit a set of capability metric messages 616 to the positioning network entity 606. The positioning network entity 606 may receive set of capability metric messages 616 from at least one of the set of positioning neighbor wireless devices 604. The at least one of the set of positioning neighbor wireless devices 604 may transmit the set of capability metric messages 616 as part of NRPPa TRP information messaging. The set of capability metric messages 616 may include a set of positioning model capability metrics associated with a set of positioning models that at least one of the set of positioning neighbor wireless devices 604 may use to calculate or estimate a set of estimated positioning results.

In response to receiving the set of capability metric messages 616, the positioning network entity 606 may transmit a set of positioning model configuration messages 618 to the set of positioning neighbor wireless devices 604 based on the set of capability metric messages 616. The set of positioning neighbor wireless devices 604 may receive the set of positioning model configuration messages 618. The configuration may be generated to satisfy a set of indicated positioning signal configuration conditions of the set of capability metric messages 616. The set of positioning model configuration messages 618 may include configuration for the set of positioning signals 630. At 628, at least some of the set of positioning neighbor wireless devices 604 may apply the configurations to receive the set of positioning signals 630 from the positioning target wireless device 602.

The positioning target wireless device 602 may transmit the set of positioning signals 630 to at least some of the set of positioning neighbor wireless devices 604 based on the configurations. At least some of the set of positioning neighbor wireless devices 604 may receive the set of positioning signals 630 from the positioning target wireless device 602 based on the configurations. The set of positioning signals 630 may include a set of SRSs. At 634, at least some of the set of positioning neighbor wireless devices 604 may measure the set of positioning signals 630. The set of positioning model configuration messages 618 may indicate one or more positioning models that at least one of the set of positioning neighbor wireless devices 604 may use to calculate or estimate the estimated positioning results. At 638, at least one of the set of positioning neighbor wireless devices 604 may calculate a set of estimated positioning results based on the measurements of the set of positioning signals 630 taken at 634. At least one of the set of positioning neighbor wireless devices 604 may use a set of positioning models to calculate the set of estimated positioning results based on the set of positioning model configuration messages 618.

The set of positioning neighbor wireless devices 604 may transmit a set of positioning results 642 to the positioning network entity 606. The positioning network entity 606 may receive the set of positioning results 642 from the set of positioning neighbor wireless devices 604.

In some aspects, the positioning network entity 606 may configure the positioning model configuration message 612 and the set of positioning model configuration messages 618 based on both the capability metric message 610 and the set of capability metric messages 616. For example, the positioning network entity 606 may select a number of TRPs from the set of positioning neighbor wireless devices 604 to transmit the PRSs based on a number of TRPs indicated in the positioning model configuration message 612 and may select a number of antenna ports for the positioning target wireless device 602 to use based on a number of antenna ports indicated in the set of capability metric messages 616.

Figure 7:
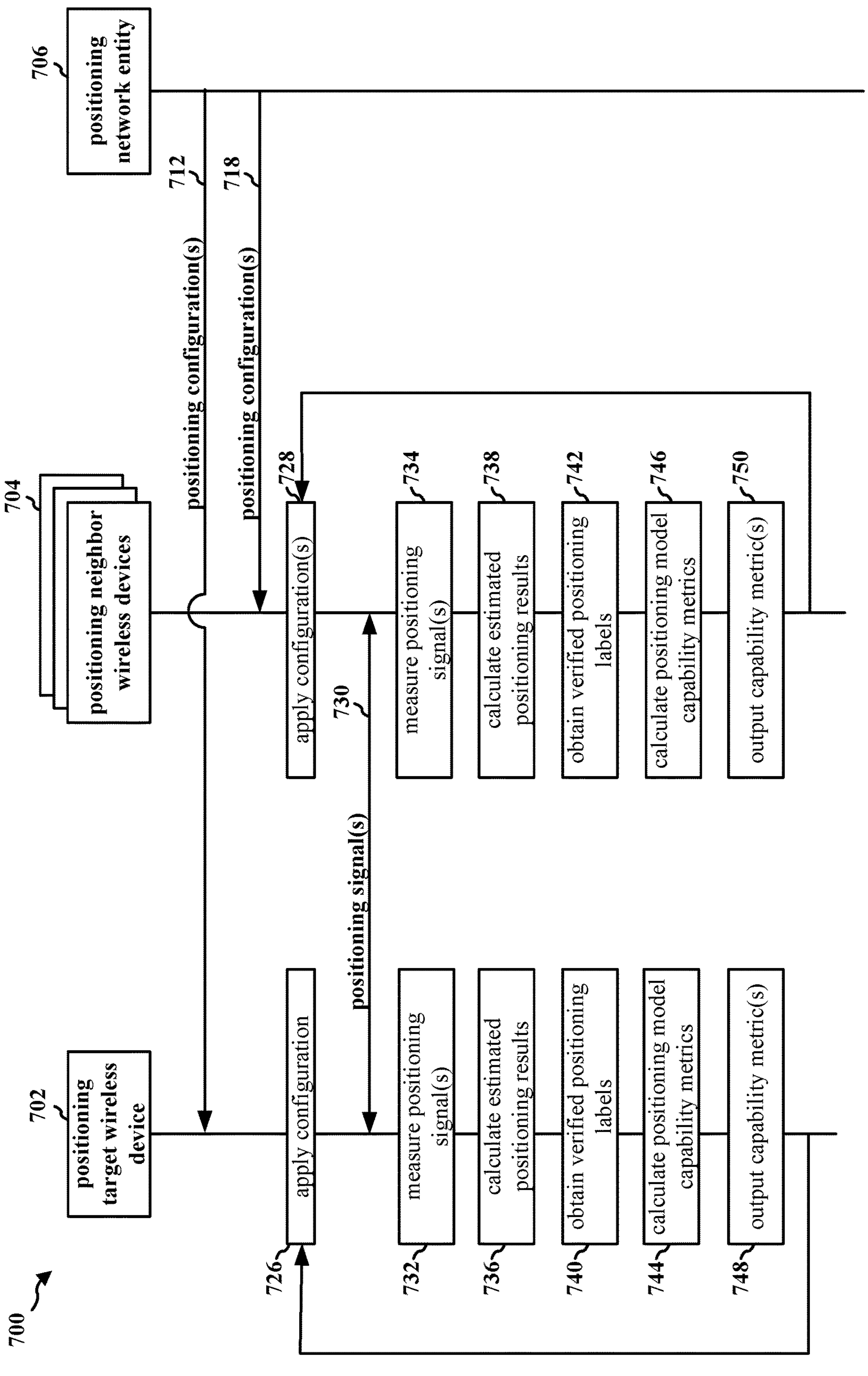
FIG. 7 is a connection diagram illustrating a positioning network entity that configures positioning signals for a positioning target wireless device and/or a set of positioning neighbor wireless devices to calculate capability metrics for positioning models, in accordance with various aspects of the present disclosure.

FIG. 7 is a connection diagram 700 illustrating a positioning network entity 706 that configures positioning signals for a positioning target wireless device 702 and/or a set of positioning neighbor wireless devices 704 to calculate capability metrics for positioning models. The positioning target wireless device 702 may include a UE or a network node, for example the UE 104 in FIG. 1 or the base station 102 in FIG. 1. The set of positioning neighbor wireless devices may include a set of UEs and/or a set of network nodes. The positioning network entity 706 may include a base station, or a component of a core network, for example the LMF 166 or the set of location servers 168 in FIG. 1.

The positioning network entity 706 may configure a set of positioning configurations for the positioning target wireless device 702 and/or the set of positioning neighbor wireless devices 704 to determine the capabilities of positioning models at the positioning target wireless device 702 and/or the set of positioning neighbor wireless devices 704. In some aspects, the positioning network entity 706 may configure the set of positioning configurations as a set of permutations of a set of positioning configurations and a set of positioning scenarios for the wireless devices, for example different locations, different channel bandwidths, different environments, different numbers of TRPs transmitting the positioning signals, etc.

The positioning network entity 706 may transmit a set of positioning configurations 712 to the positioning target wireless device 702. The positioning target wireless device 702 may receive the set of positioning configurations 712. The set of positioning configurations 712 may include a set of configurations for the set of positioning signals 730, for example sets of SRSs to be transmitted by the positioning target wireless device 702 and/or sets of PRSs to be received and measured by the positioning target wireless device 702. At 726, the positioning target wireless device 702 may apply one of the configurations to transmit the set of positioning signals 730 at the set of positioning neighbor wireless devices 704 or to receive and measure the set of positioning signals 730 from the set of positioning neighbor wireless devices 704.

The positioning network entity 706 may transmit a set of positioning configurations 718 to the set of positioning neighbor wireless devices 704. The set of positioning neighbor wireless devices 704 may receive the set of positioning configurations 718. The set of positioning configurations 718 may include a set of configurations for the set of positioning signals 730, for example sets of PRSs to be transmitted by the set of positioning neighbor wireless devices 704 and/or SRSs to be received and measured by the set of positioning neighbor wireless devices 704. At 726, the set of positioning neighbor wireless devices 704 may apply one of the configurations to transmit the set of positioning signals 730 at the positioning target wireless device 702 or to receive and measure the set of positioning signals 730 from the positioning target wireless device 702.

At 732, the positioning target wireless device 702 may measure the set of positioning signals 730. At 736, the positioning target wireless device 702 may calculate estimated positioning results based on the measurements of the set of positioning signals 730.

At 740, the positioning target wireless device 702 may obtain verified positioning results. The positioning target wireless device 702 may obtain the verified positioning results in a variety of ways. For example, if the verified positioning results include a position of the positioning target wireless device 702, the positioning target wireless device 702 may be positioned in a known location that is stored in a memory of the positioning target wireless device 702. In another example, the positioning target wireless device 702 may have a sensor, such as a GPS or a LIDAR sensor, that may be used to identify the location of the positioning target wireless device 702. In another example, the positioning network entity 706 may be an LMF that may calculate the location of the positioning target wireless device 702, and may transmit the calculated location of the positioning target wireless device 702 to the positioning target wireless device 702. In another example, if the verified positioning results include an intermediate measurement, such as a LOS identification, the parameters of the intermediate measurement may be set as part of a lab experiment setup, and may be saved on a memory of the positioning target wireless device 702. In another example, the positioning target wireless device 702 may have a sensor, such as a LIDAR sensor, which may identify obstacles that may or may not block a LOS between the positioning target wireless device 702 and one of the set of positioning neighbor wireless devices 704. In another example, the positioning network entity 706 may be an LMF that may identify objects in a field based on blocked or reflected signals to other wireless devices, and may transmit a verified LOS identification to the positioning target wireless device 702.

At 744, the positioning target wireless device 702 may calculate one or more capability metrics of the positioning model based on the calculated estimated positioning results at 736 and/or the verified positioning labels obtained at 740. For example, the positioning target wireless device 702 may calculate an accuracy of the positioning model based on a difference between the calculated estimated positioning results at 736 and the verified positioning labels obtained at 740. In another example, the positioning target wireless device 702 may calculate a latency of the positioning model based on the time when the positioning model started and finished its calculations. In another example, the positioning target wireless device 702 may calculate a power consumption of the positioning model based on a battery/capacitor capacity at the time when the positioning model started its calculations and a battery/capacitor capacity at the time when the positioning model finished its calculations.

At 748, the positioning target wireless device 702 may output one or more of the calculated capability metrics. In one aspect, the positioning target wireless device 702 may save the calculated capability metrics on a memory of the positioning target wireless device 702. In another aspect, the positioning target wireless device 702 may transmit the calculated capability metrics to a device via a physical wired connection, such as a USB connection, to another computing device. In another aspect, the positioning target wireless device 702 may transmit the calculated capability metrics to one of the set of positioning neighbor wireless devices 704, the positioning network entity 706, or some other wireless device.

The positioning target wireless device 702 may apply a different configuration at 726 until all of the permutations of the set of positioning configurations 712 are completed. In some aspects, the positioning target wireless device 702 may repeatedly apply different configurations at 726 after calculating the estimated positioning results at 736 or after obtaining verified positioning labels at 740 to save time between positioning sessions. In some aspects, the positioning network entity may repeatedly transmit a set of positioning configurations 712 in between each positioning session instead of transmitting a full set of positioning configurations that include every permutation for a lab test.

At 734, one or more of the set of positioning neighbor wireless devices 704 may measure the set of positioning signals 730. At 738, one or more of the set of positioning neighbor wireless devices 704 may calculate estimated positioning results based on the measurements of the set of positioning signals 730.

At 742, one or more of the set of positioning neighbor wireless devices 704 may obtain verified positioning results. A positioning neighbor wireless device may obtain the verified positioning results in a variety of ways. For example, if the verified positioning results include a position of the positioning target wireless device 702, the positioning target wireless device 702 may be positioned in a known location that is stored in a memory of the positioning neighbor wireless device. In another example, the positioning target wireless device 702 may have a sensor, such as a GPS or a LIDAR sensor, that may be used to identify the location of the positioning target wireless device 702, and may transmit its location to the positioning neighbor wireless device. In another example, the positioning network entity 706 may be an LMF that may calculate the location of the positioning target wireless device 702, and may transmit the calculated location of the positioning target wireless device 702 to the positioning neighbor wireless device. In another example, if the verified positioning results include an intermediate measurement, such as a LOS identification, the parameters of the intermediate measurement may be set as part of a lab experiment setup, and may be saved on a memory of the positioning neighbor wireless device. In another example, the positioning neighbor wireless device may have a sensor, such as a LIDAR sensor, which may identify obstacles that may or may not block a LOS between the positioning target wireless device 702 and the positioning neighbor wireless device. In another example, the positioning network entity 706 may be an LMF that may identify objects in a field based on blocked or reflected signals to other wireless devices, and may transmit a verified LOS identification to the positioning neighbor wireless device.

At 746, one or more of the set of positioning neighbor wireless devices 704 may calculate one or more capability metrics of their positioning model based on the calculated estimated positioning results at 738 and/or the verified positioning labels obtained at 742. For example, a positioning neighbor wireless device may calculate an accuracy of the positioning model based on a difference between the calculated estimated positioning results at 738 and the verified positioning labels obtained at 742. In another example, the positioning neighbor wireless device may calculate a latency of the positioning model based on the time when the positioning model started and finished its calculations. In another example, the positioning neighbor wireless device may calculate a power consumption of the positioning model based on a battery/capacitor capacity at the time when the positioning model started its calculations and a battery/capacitor capacity at the time when the positioning model finished its calculations.

At 750, one or more of the set of positioning neighbor wireless devices 704 may output one or more of the calculated capability metrics. In one aspect, a positioning neighbor wireless device may save the calculated capability metrics on a memory of the positioning neighbor wireless device. In another aspect, a positioning neighbor wireless device may transmit the calculated capability metrics to a device via a physical wired connection, such as a backhaul connection, to another device, such as a core network. In another aspect, a positioning neighbor wireless device may transmit the calculated capability metrics to the positioning network entity 706 or another wireless device.

The set of positioning neighbor wireless devices 704 may apply a different configuration at 728 until all of the permutations of the set of positioning configurations 718 are completed. In some aspects, the set of positioning neighbor wireless devices 704 may repeatedly apply different configurations at 728 after calculating the estimated positioning results at 738 or after obtaining verified positioning labels at 742 to save time between positioning sessions. In some aspects, the positioning network entity may repeatedly transmit a set of positioning configurations 718 in between each positioning session instead of transmitting a full set of positioning configurations that include every permutation for a lab test.

Figure 8:
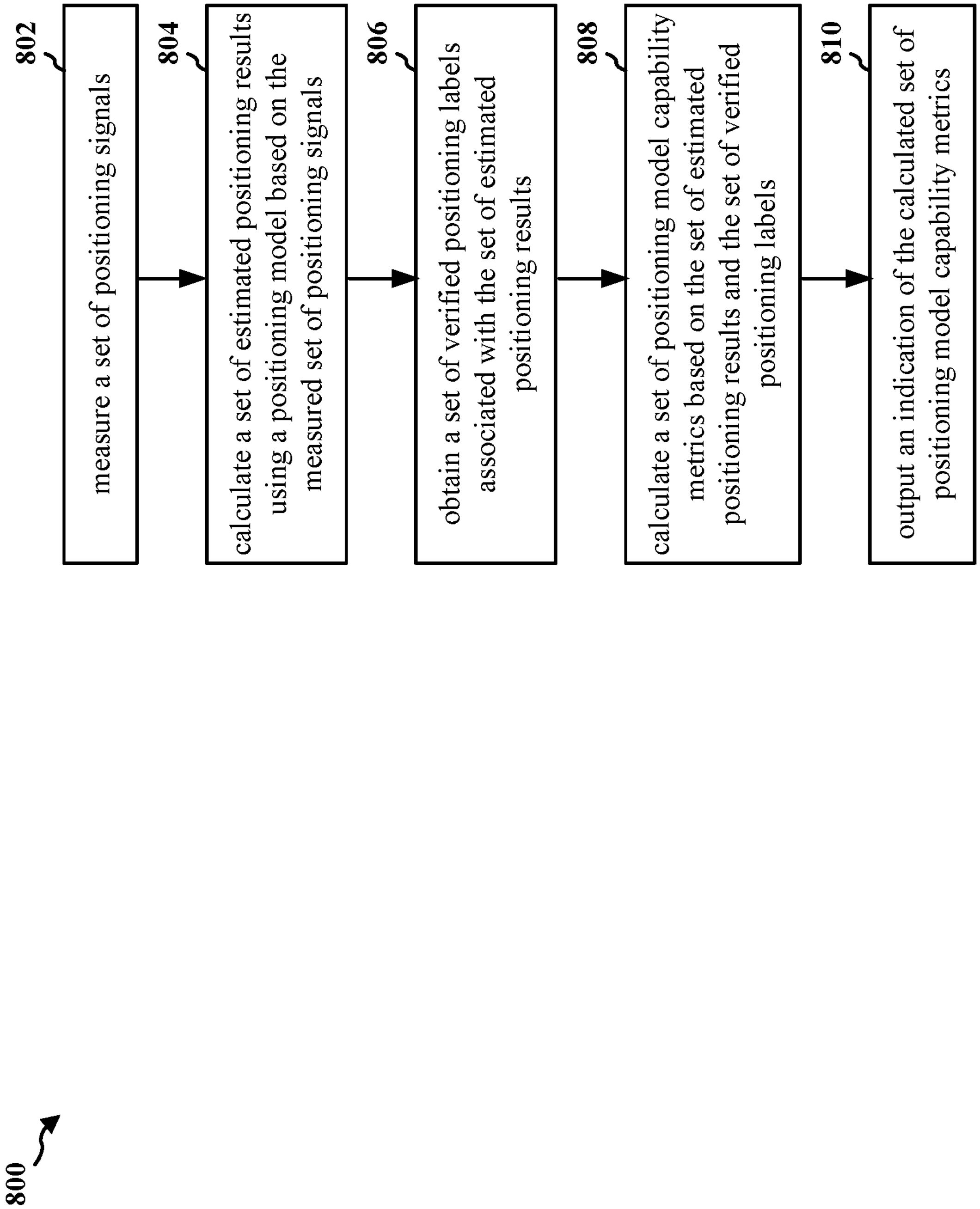
FIG. 8 is a flowchart of a method of wireless communication.

FIG. 8 is a flowchart 800 of a method of wireless communication. The method may be performed by a wireless device (e.g., the UE 104, the UE 350; the base station 102; the base station 310; the wireless device 402, the wireless device 404, the wireless device 406; the positioning target wireless device 602, the positioning target wireless device 702; the set of positioning neighbor wireless devices 604, the set of positioning neighbor wireless devices 704; the apparatus 1204; the network entity 1202, the network entity 1302, the network entity 1460). At 802, the wireless device may measure a set of positioning signals. For example, 802 may be performed by the positioning target wireless device 702 in FIG. 7, which may, at 732, measure the set of positioning signals 730 from the set of positioning neighbor wireless devices 704. Moreover, 802 may be performed by the component 198 in FIG. 1, 3, 12, or 13.

At 804, the wireless device may calculate a set of estimated positioning results using a positioning model based on the measured set of positioning signals. For example, 804 may be performed by the positioning target wireless device 702 in FIG. 7, which may, at 736, calculate a set of estimated positioning results using a positioning model based on measurements of the set of positioning signals 730 measured at 732. Moreover, 804 may be performed by the component 198 in FIG. 1, 3, 12, or 13.

At 806, the wireless device may obtain a set of verified positioning labels associated with the set of estimated positioning results. For example, 806 may be performed by the positioning target wireless device 702 in FIG. 7, which may, at 740, obtain a set of verified positioning labels associated with the set of estimated positioning results. Moreover, 806 may be performed by the component 198 in FIG. 1, 3, 12, or 13.

At 808, the wireless device may calculate a set of positioning model capability metrics based on the set of estimated positioning results and the set of verified positioning labels. For example, 808 may be performed by the positioning target wireless device 702 in FIG. 7, which may, at 744, calculate a set of positioning model capability metrics based on the set of estimated positioning results calculated at 736 and the set of verified positioning labels obtained at 740. Moreover, 808 may be performed by the component 198 in FIG. 1, 3, 12, or 13.

At 810, the wireless device may output an indication of the calculated set of positioning model capability metrics. For example, 810 may be performed by the positioning target wireless device 702 in FIG. 7, which may, at 748, output an indication of the calculated set of positioning model capability metrics. Moreover, 810 may be performed by the component 198 in FIG. 1, 3, 12, or 13.

Figure 9:
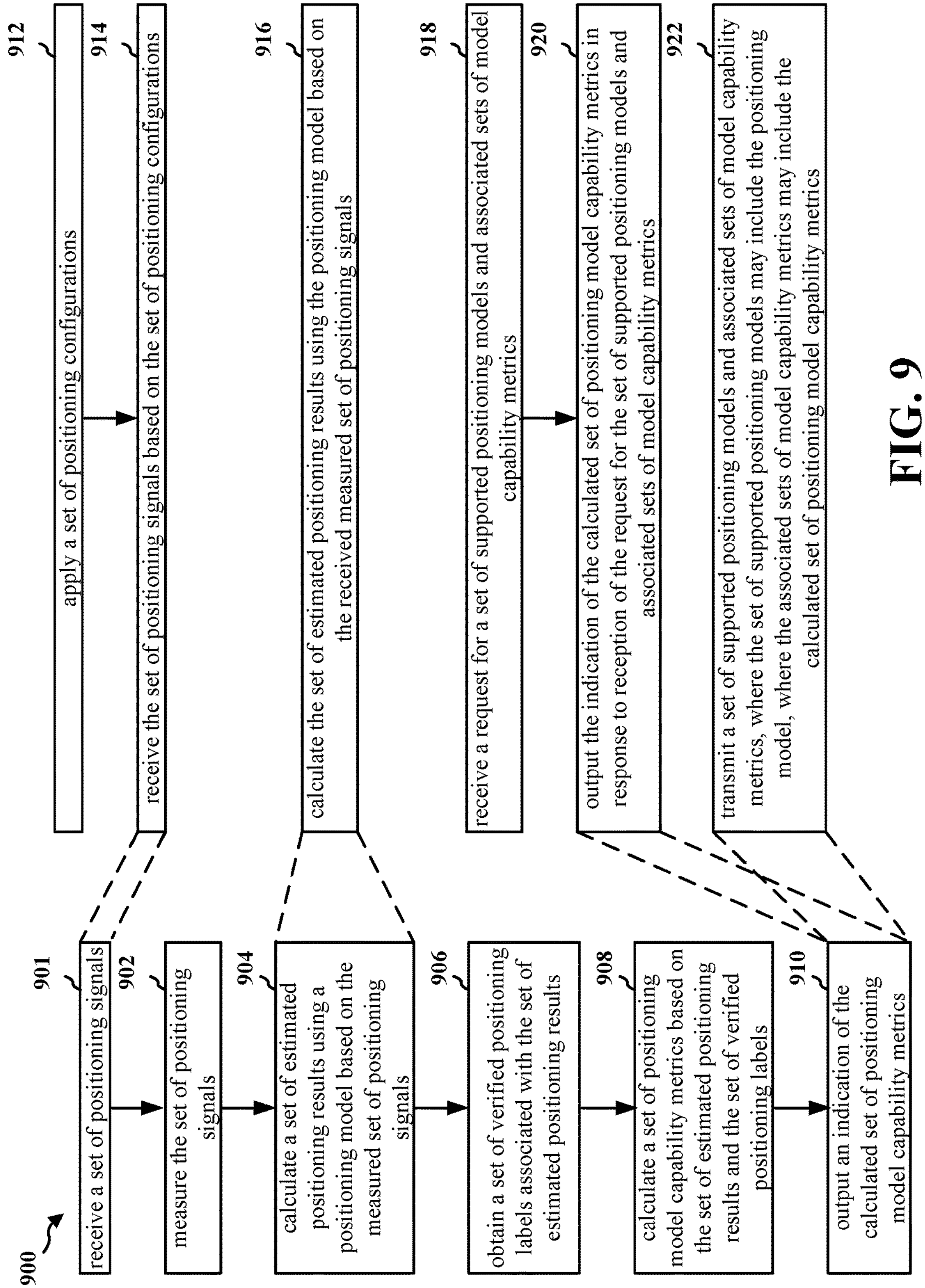
FIG. 9 is a flowchart of a method of wireless communication.

FIG. 9 is a flowchart 900 of a method of wireless communication. The method may be performed by a wireless device (e.g., the UE 104, the UE 350; the base station 102; the base station 310; the wireless device 402, the wireless device 404, the wireless device 406; the positioning target wireless device 602, the positioning target wireless device 702; the set of positioning neighbor wireless devices 604, the set of positioning neighbor wireless devices 704; the apparatus 1204; the network entity 1202, the network entity 1302, the network entity 1460). At 901, the wireless device may receive a set of positioning signals. For example, 901 may be performed by the positioning target wireless device 702 in FIG. 7, which may receive the set of positioning signals 730. Moreover, 901 may be performed by the component 198 in FIG. 1, 3, 12, or 13.

At 902, the wireless device may measure a set of positioning signals. For example, 902 may be performed by the positioning target wireless device 702 in FIG. 7, which may, at 732, measure the set of positioning signals 730 from the set of positioning neighbor wireless devices 704. Moreover, 902 may be performed by the component 198 in FIG. 1, 3, 12, or 13.

At 904, the wireless device may calculate a set of estimated positioning results using a positioning model based on the measured set of positioning signals. For example, 904 may be performed by the positioning target wireless device 702 in FIG. 7, which may, at 736, calculate a set of estimated positioning results using a positioning model based on measurements of the set of positioning signals 730 measured at 732. Moreover, 904 may be performed by the component 198 in FIG. 1, 3, 12, or 13.

At 906, the wireless device may obtain a set of verified positioning labels associated with the set of estimated positioning results. For example, 906 may be performed by the positioning target wireless device 702 in FIG. 7, which may, at 740, obtain a set of verified positioning labels associated with the set of estimated positioning results. Moreover, 906 may be performed by the component 198 in FIG. 1, 3, 12, or 13.

At 908, the wireless device may calculate a set of positioning model capability metrics based on the set of estimated positioning results and the set of verified positioning labels. For example, 908 may be performed by the positioning target wireless device 702 in FIG. 7, which may, at 744, calculate a set of positioning model capability metrics based on the set of estimated positioning results calculated at 736 and the set of verified positioning labels obtained at 740. Moreover, 908 may be performed by the component 198 in FIG. 1, 3, 12, or 13.

At 910, the wireless device may output an indication of the calculated set of positioning model capability metrics. For example, 910 may be performed by the positioning target wireless device 702 in FIG. 7, which may, at 748, output an indication of the calculated set of positioning model capability metrics. Moreover, 910 may be performed by the component 198 in FIG. 1, 3, 12, or 13.

At 912, the wireless device may apply a set of positioning configurations. For example, 912 may be performed by the positioning target wireless device 702 in FIG. 7, which may, at 726, apply a set of positioning configurations of the set of positioning configurations 712. Moreover, 912 may be performed by the component 198 in FIG. 1, 3, 12, or 13.

At 914, the wireless device may receive the set of positioning signals based on the set of positioning configurations. For example, 914 may be performed by the positioning target wireless device 702 in FIG. 7, which may receive the set of positioning signals 730 from the set of positioning neighbor wireless devices based on the set of positioning configurations 712. Moreover, 914 may be performed by the component 198 in FIG. 1, 3, 12, or 13.

At 916, the wireless device may calculate the set of estimated positioning results using the positioning model based on the received measured set of positioning signals. For example, 916 may be performed by the positioning target wireless device 702 in FIG. 7, which may, at 736, calculate the set of estimated positioning results using the positioning model based on the set of positioning signals 730 measured at 732. Moreover, 916 may be performed by the component 198 in FIG. 1, 3, 12, or 13.

At 918, the wireless device may receive a request for a set of supported positioning models and associated sets of model capability metrics. For example, 918 may be performed by the positioning target wireless device 602 in FIG. 6, which may receive the support request message 608 for a set of supported positioning models and associated sets of model capability metrics of the positioning target wireless device 602. Moreover, 918 may be performed by the component 198 in FIG. 1, 3, 12, or 13.

At 920, the wireless device may output the indication of the calculated set of positioning model capability metrics in response to reception of the request for the set of supported positioning models and associated sets of model capability metrics. For example, 920 may be performed by the positioning target wireless device 602 in FIG. 6, which may output the capability metric message 610, which may include an indication of the calculated set of positioning model capability metrics in response to reception of the support request message 608 for the set of supported positioning models and associated sets of model capability metrics of the positioning target wireless device 602. Moreover, 920 may be performed by the component 198 in FIG. 1, 3, 12, or 13.

At 922, the wireless device may transmit a set of supported positioning models and associated sets of model capability metrics. The set of supported positioning models may include the positioning model. The associated sets of model capability metrics may include the calculated set of positioning model capability metrics. For example, 922 may be performed by the positioning target wireless device 602 in FIG. 6, which may transmit the capability metric message 610, which may include a set of supported positioning models and associated sets of model capability metrics. The set of supported positioning models may include the positioning model. The associated sets of model capability metrics may include the calculated set of positioning model capability metrics. Moreover, 922 may be performed by the component 198 in FIG. 1, 3, 12, or 13.

Figure 10:
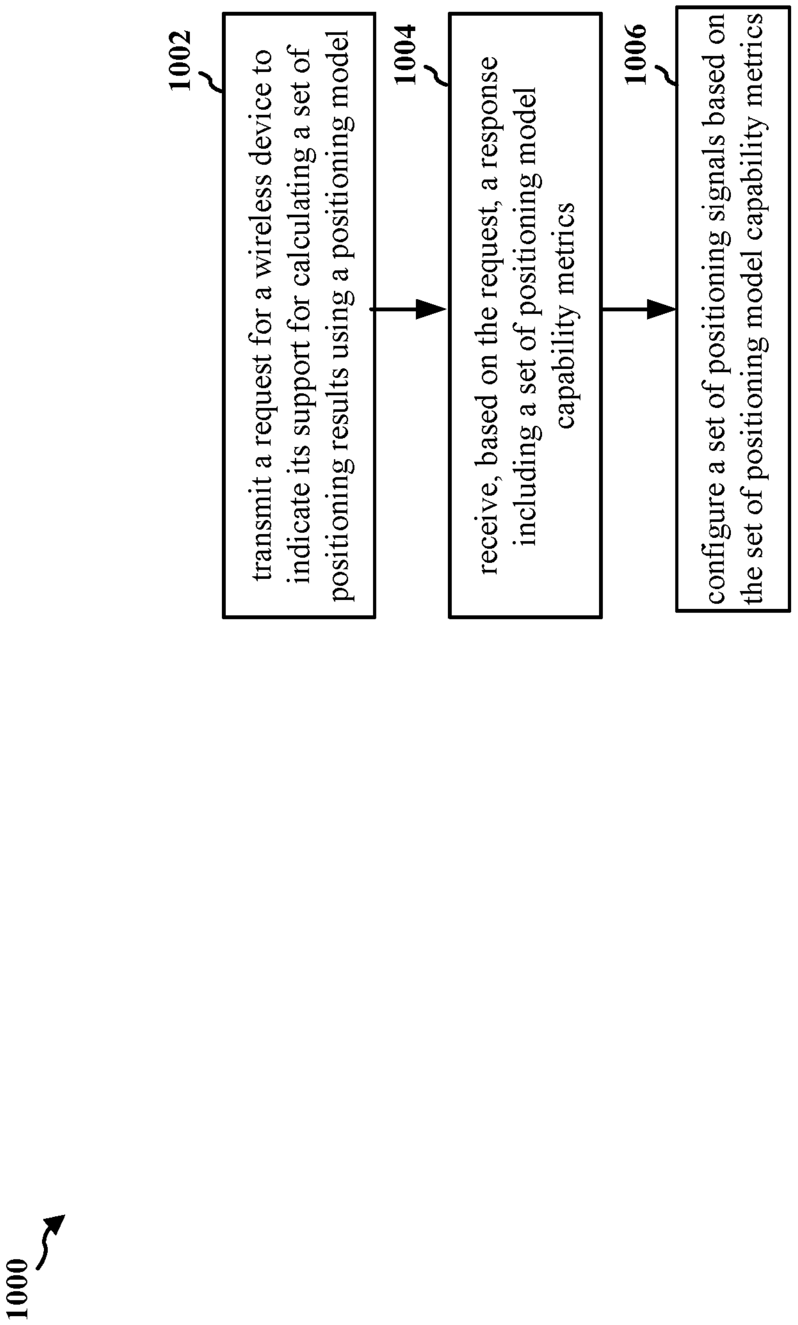
FIG. 10 is a flowchart of a method of wireless communication.

FIG. 10 is a flowchart 1000 of a method of wireless communication. The method may be performed by a network entity (e.g., the base station 102, the base station 310, the wireless device 402, the wireless device 406; the set of positioning wireless devices 604, the set of positioning wireless devices 704; the positioning network entity 606, the positioning network entity 706; the network entity 1202, the network entity 1302, the network entity 1460). At 1002, the network entity may transmit a request for a wireless device to indicate its support for calculating a set of positioning results using a positioning model. For example, 1002 may be performed by the positioning network entity 606 in FIG. 6, which may transmit a support request message 608 for the positioning target wireless device 602 to indicate its support for calculating a set of positioning results using a positioning model. Moreover, 1002 may be performed by the component 199 in FIG. 1, 3, 13, or 14.

At 1004, the network entity may receive, based on the request, a response including a set of positioning model capability metrics. For example, 1004 may be performed by the positioning network entity 606 in FIG. 6, which may receive, based on the request, a capability metric message 610 including a set of positioning model capability metrics. Moreover, 1004 may be performed by the component 199 in FIG. 1, 3, 13, or 14.

At 1006, the network entity may configure a set of positioning signals based on the set of positioning model capability metrics. For example, 1006 may be performed by the positioning network entity 606 in FIG. 6, which may configure a set of positioning signals based on the set of positioning model capability metrics and may transmit that configuration in the positioning model configuration message 612. Moreover, 1006 may be performed by the component 199 in FIG. 1, 3, 13, or 14.

Figure 11:
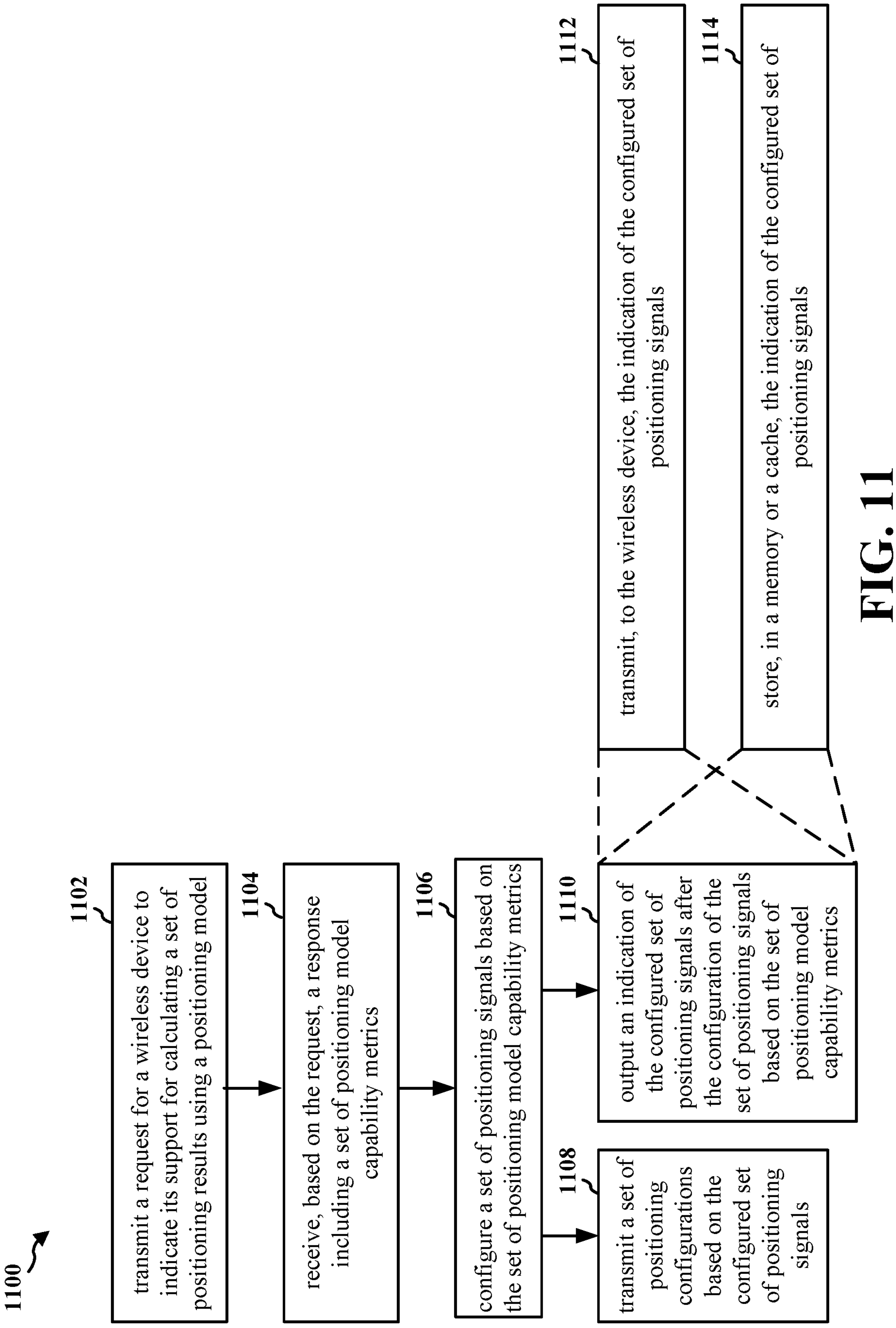
FIG. 11 is a flowchart of a method of wireless communication.

FIG. 11 is a flowchart 1100 of a method of wireless communication. The method may be performed by a network entity (e.g., the base station 102, the base station 310, the wireless device 402, the wireless device 406; the set of positioning wireless devices 604, the set of positioning wireless devices 704; the positioning network entity 606, the positioning network entity 706; the network entity 1202, the network entity 1302, the network entity 1460). At 1102, the network entity may transmit a request for a wireless device to indicate its support for calculating a set of positioning results using a positioning model. For example, 1102 may be performed by the positioning network entity 606 in FIG. 6, which may transmit a support request message 608 for the positioning target wireless device 602 to indicate its support for calculating a set of positioning results using a positioning model. Moreover, 1102 may be performed by the component 199 in FIG. 1, 3, 13, or 14.

At 1104, the network entity may receive, based on the request, a response including a set of positioning model capability metrics. For example, 1104 may be performed by the positioning network entity 606 in FIG. 6, which may receive, based on the request, a capability metric message 610 including a set of positioning model capability metrics. Moreover, 1104 may be performed by the component 199 in FIG. 1, 3, 13, or 14.

At 1106, the network entity may configure a set of positioning signals based on the set of positioning model capability metrics. For example, 1106 may be performed by the positioning network entity 606 in FIG. 6, which may configure a set of positioning signals based on the set of positioning model capability metrics and may transmit that configuration in the positioning model configuration message 612. Moreover, 1106 may be performed by the component 199 in FIG. 1, 3, 13, or 14.

At 1108, the network entity may transmit a set of positioning configurations based on the configured set of positioning signals. For example, 1108 may be performed by the positioning network entity 606 in FIG. 6, which may transmit a set of positioning configurations as the positioning model configuration message 612 to the positioning target wireless device based on the configured set of positioning signals. Moreover, 1108 may be performed by the component 199 in FIG. 1, 3, 13, or 14.

At 1110, the network entity may output an indication of the configured set of positioning signals after the configuration of the set of positioning signals based on the set of positioning model capability metrics. For example, 1110 may be performed by the positioning network entity 706 in FIG. 7, which may output an indication of the configured set of positioning signals after the configuration of the set of positioning signals based on the set of positioning model capability metrics. Moreover, 1110 may be performed by the component 199 in FIG. 1, 3, 13, or 14.

At 1112, the network entity may transmit, to the wireless device, the indication of the configured set of positioning signals. For example, 1112 may be performed by the positioning network entity 706 in FIG. 7, which may transmit, to the wireless device, the indication of the configured set of positioning signals. Moreover, 1112 may be performed by the component 199 in FIG. 1, 3, 13, or 14.

At 1114, the network entity may store, in a memory or a cache, the indication of the configured set of positioning signals. For example, 1114 may be performed by the positioning network entity 706 in FIG. 7, which may store, in a memory or a cache, the indication of the configured set of positioning signals. Moreover, 1114 may be performed by the component 199 in FIG. 1, 3, 13, or 14.

Figure 12:
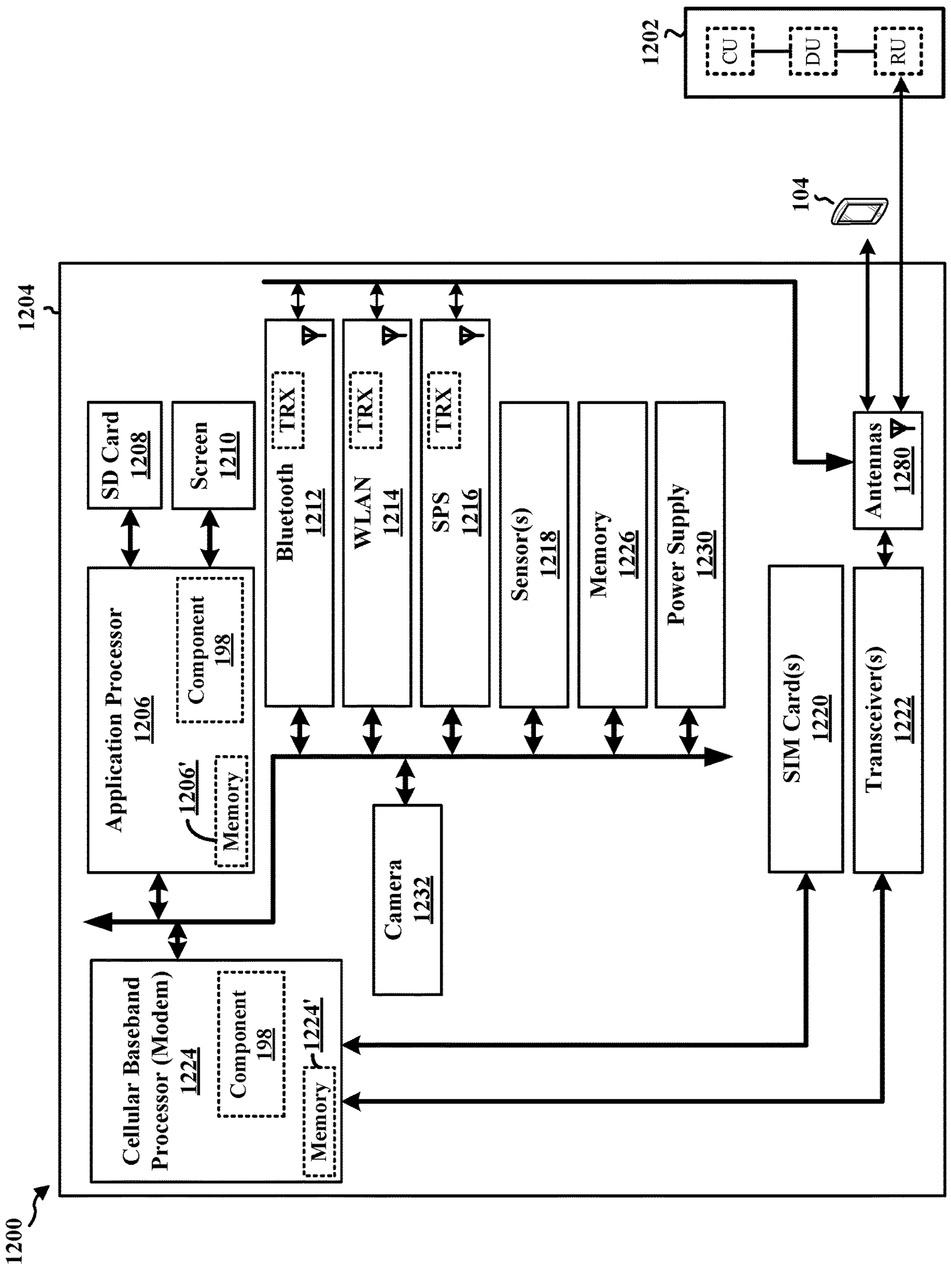
FIG. 12 is a diagram illustrating an example of a hardware implementation for an example apparatus.

FIG. 12 is a diagram 1200 illustrating an example of a hardware implementation for an apparatus 1204. The apparatus 1204 may be a UE, a component of a UE, or may implement UE functionality. In some aspects, the apparatus 904 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 may be configured to measure a set of positioning signals. The component 198 may be configured to calculate a set of estimated positioning results using a positioning model based on the measured set of positioning signals. The component 198 may be configured to obtain a set of verified positioning labels associated with the set of estimated positioning results. The component 198 may be configured to calculate a set of positioning model capability metrics based on the set of estimated positioning results and the set of verified positioning labels. The component 198 may be configured to output an indication of the calculated set of positioning model capability metrics. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for measuring a set of positioning signals. The apparatus 1204 may include means for calculating a set of estimated positioning results using a positioning model based on the measured set of positioning signals. The apparatus 1204 may include means for obtaining a set of verified positioning labels associated with the set of estimated positioning results. The apparatus 1204 may include means for calculating a set of positioning model capability metrics based on the set of estimated positioning results and the set of verified positioning labels. The apparatus 1204 may include means for outputting an indication of the calculated set of positioning model capability metrics. The apparatus 1204 may include means for receiving the set of positioning signals prior to the measurement of the set of positioning signals. The apparatus 1204 may include means for calculating the set of estimated positioning results by calculating the set of estimated positioning results using the positioning model based on the received measured set of positioning signals. The apparatus 1204 may include means for applying a set of positioning configurations prior to the reception of the set of positioning signals. The apparatus 1204 may include means for receiving the set of positioning signals by receiving the set of positioning signals based on the set of positioning configurations. The set of positioning model capability metrics may include at least one of (a) a positioning model accuracy, (b) a positioning model latency, or (c) a positioning model power consumption. The positioning model accuracy may include at least one of (a) a percentile of accuracy errors, (b) an average of the accuracy errors, (c) a range of positioning errors, or (d) a confidence interval. The apparatus 1204 may include means for receiving a request for a set of supported positioning models and associated sets of model capability metrics. The request may include at least one of (a) a set of positioning configurations, (b) a set of model accuracy levels, (c) a set of model latency levels, or (d) a set of model power consumption levels. The apparatus 1204 may include means for transmitting a set of supported positioning models and associated sets of model capability metrics. The set of supported positioning models may include the positioning model. The associated sets of model capability metrics may include the calculated set of positioning model capability metrics. The set of positioning signals may include a set of SRSs or a set of PRSs. The wireless device may include a UE or a network node. The apparatus 1204 may include means for outputting the indication of the calculated set of positioning model capability metrics by transmitting, for a network entity, the indication of the calculated set of positioning model capability metrics. The apparatus 1204 may include means for outputting the indication of the calculated set of positioning model capability metrics by storing, in a memory or a cache, the indication of the calculated set of positioning model capability metrics. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
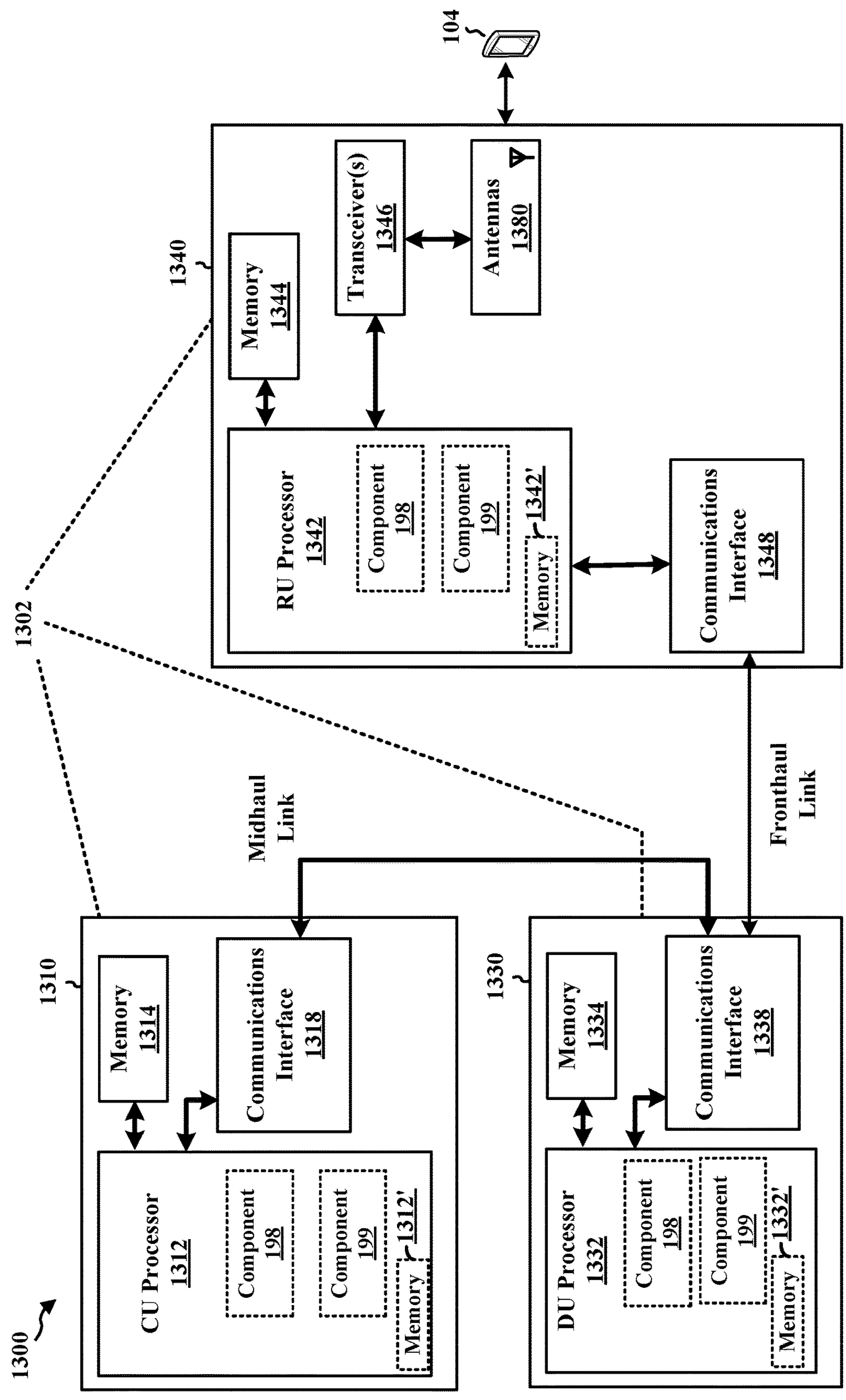
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to measure a set of positioning signals. The component 198 may be configured to calculate a set of estimated positioning results using a positioning model based on the measured set of positioning signals. The component 198 may be configured to obtain a set of verified positioning labels associated with the set of estimated positioning results. The component 198 may be configured to calculate a set of positioning model capability metrics based on the set of estimated positioning results and the set of verified positioning labels. The component 198 may be configured to output an indication of the calculated set of positioning model capability metrics. The component 198 may be within one or more processors of one or more of the CU 1310, DU 1330, and the RU 1340. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for measuring a set of positioning signals. The network entity 1302 may include means for calculating a set of estimated positioning results using a positioning model based on the measured set of positioning signals. The network entity 1302 may include means for obtaining a set of verified positioning labels associated with the set of estimated positioning results. The network entity 1302 may include means for calculating a set of positioning model capability metrics based on the set of estimated positioning results and the set of verified positioning labels. The network entity 1302 may include means for outputting an indication of the calculated set of positioning model capability metrics. The network entity 1302 may include means for receiving the set of positioning signals prior to the measurement of the set of positioning signals. The network entity 1302 may include means for calculating the set of estimated positioning results by calculating the set of estimated positioning results using the positioning model based on the received measured set of positioning signals. The network entity 1302 may include means for applying a set of positioning configurations prior to the reception of the set of positioning signals. The network entity 1302 may include means for receiving the set of positioning signals by receiving the set of positioning signals based on the set of positioning configurations. The set of positioning model capability metrics may include at least one of (a) a positioning model accuracy, (b) a positioning model latency, or (c) a positioning model power consumption. The positioning model accuracy may include at least one of (a) a percentile of accuracy errors, (b) an average of the accuracy errors, (c) a range of positioning errors, or (d) a confidence interval. The network entity 1302 may include means for receiving a request for a set of supported positioning models and associated sets of model capability metrics. The request may include at least one of (a) a set of positioning configurations, (b) a set of model accuracy levels, (c) a set of model latency levels, or (d) a set of model power consumption levels. The network entity 1302 may include means for transmitting a set of supported positioning models and associated sets of model capability metrics. The set of supported positioning models may include the positioning model. The associated sets of model capability metrics may include the calculated set of positioning model capability metrics. The set of positioning signals may include a set of SRSs or a set of PRSs. The wireless device may include a UE or a network node. The network entity 1302 may include means for outputting the indication of the calculated set of positioning model capability metrics by transmitting, for a network entity, the indication of the calculated set of positioning model capability metrics. The network entity 1302 may include means for outputting the indication of the calculated set of positioning model capability metrics by storing, in a memory or a cache, the indication of the calculated set of positioning model capability metrics. The means may be the component 198 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to transmit a request for a wireless device to indicate its support for calculating a set of positioning results using a positioning model. The component 199 may be configured to receive, based on the request, a response including a set of positioning model capability metrics. The component 199 may be configured to configure a set of positioning signals based on the set of positioning model capability metrics. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for transmitting a request for a wireless device to indicate its support for calculating a set of positioning results using a positioning model. The network entity 1302 may include means for receiving, based on the request, a response including a set of positioning model capability metrics. The network entity 1302 may include means for configuring a set of positioning signals based on the set of positioning model capability metrics. The network entity 1302 may include means for transmitting a set of positioning configurations based on the configured set of positioning signals. The set of positioning model capability metrics may include at least one of (a) a positioning model accuracy, (b) a positioning model latency, or (c) a positioning model power consumption. The positioning model accuracy may include at least one of (a) a percentile of accuracy errors, (b) an average of the accuracy errors, (c) a range of positioning errors, or (d) a confidence interval. The request may include a set of supported positioning models and associated sets of model capability metrics. The associated sets of model capability metrics may include the set of positioning model capability metrics. The request may include at least one of (a) a set of positioning configurations, (b) a set of model accuracy levels, (c) a set of model latency levels, or (d) a set of model power consumption levels. The configured set of positioning signals may include a set of SRSs or a set of PRSs. the network entity 1302 may include a LMF. The network entity 1302 may include means for outputting an indication of the configured set of positioning signals after the configuration of the set of positioning signals based on the set of positioning model capability metrics. The network entity 1302 may include means for outputting the indication of the configured set of positioning signals by transmitting, to the wireless device, the indication of the configured set of positioning signals. The network entity 1302 may include means for outputting the indication of the configured set of positioning signals by storing, in a memory or a cache, the indication of the configured set of positioning signals. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
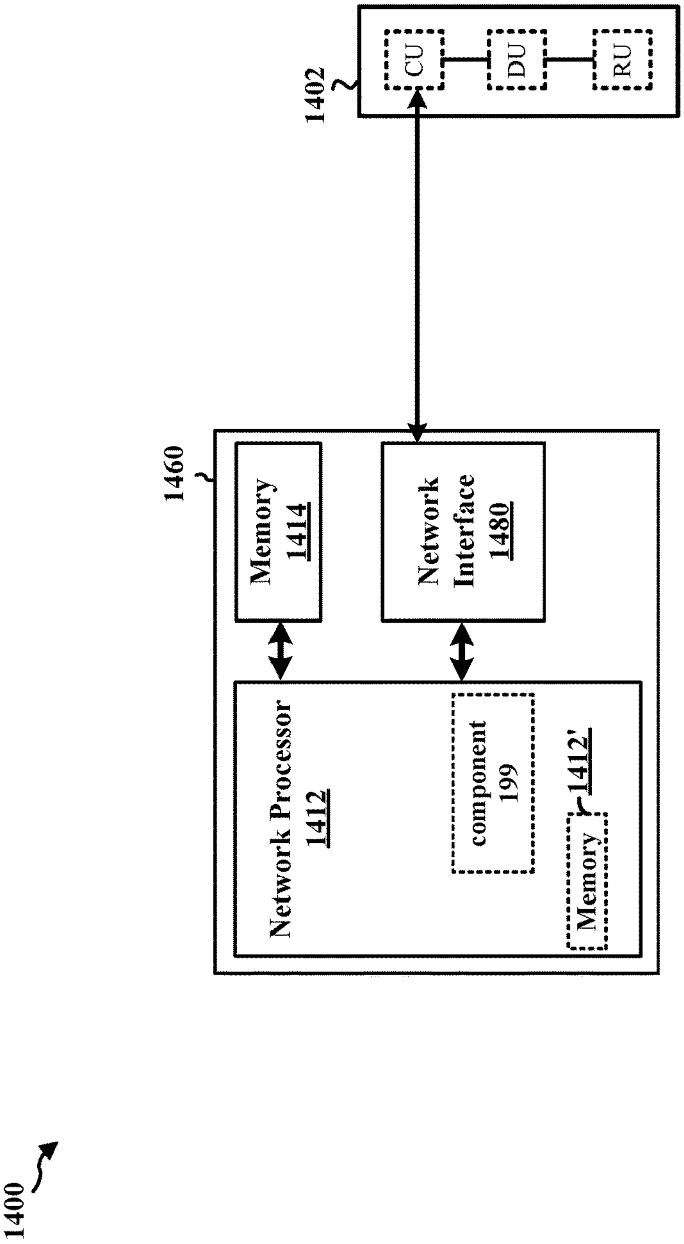
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a request for a wireless device to indicate its support for calculating a set of positioning results using a positioning model. The component 199 may be configured to receive, based on the request, a response including a set of positioning model capability metrics. The component 199 may be configured to configure a set of positioning signals based on the set of positioning model capability metrics. The component 199 may be within the processor 1412. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for transmitting a request for a wireless device to indicate its support for calculating a set of positioning results using a positioning model. The network entity 1460 may include means for receiving, based on the request, a response including a set of positioning model capability metrics. The network entity 1460 may include means for configuring a set of positioning signals based on the set of positioning model capability metrics. The network entity 1460 may include means for transmitting a set of positioning configurations based on the configured set of positioning signals. The set of positioning model capability metrics may include at least one of (a) a positioning model accuracy, (b) a positioning model latency, or (c) a positioning model power consumption. The positioning model accuracy may include at least one of (a) a percentile of accuracy errors, (b) an average of the accuracy errors, (c) a range of positioning errors, or (d) a confidence interval. The request may include a set of supported positioning models and associated sets of model capability metrics. The associated sets of model capability metrics may include the set of positioning model capability metrics. The request may include at least one of (a) a set of positioning configurations, (b) a set of model accuracy levels, (c) a set of model latency levels, or (d) a set of model power consumption levels. The configured set of positioning signals may include a set of SRSs or a set of PRSs. the network entity 1460 may include a LMF. The network entity 1460 may include means for outputting an indication of the configured set of positioning signals after the configuration of the set of positioning signals based on the set of positioning model capability metrics. The network entity 1460 may include means for outputting the indication of the configured set of positioning signals by transmitting, to the wireless device, the indication of the configured set of positioning signals. The network entity 1460 may include means for outputting the indication of the configured set of positioning signals by storing, in a memory or a cache, the indication of the configured set of positioning signals. The means may be the component 199 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may output the data to a component or a module of the device (e.g., a memory, a database, a program). A device configured to "obtain" data, such as a transmission, signal, or message, may receive the data, for example with a transceiver, may obtain the data from a device that receives the data, or may obtain the data from a module or component of the device (e.g., a memory, a database, a program). All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, wherein the method comprises measuring a set of positioning signals. The method comprises calculating a set of estimated positioning results using a positioning model based on the measured set of positioning signals. The method comprises obtaining a set of verified positioning labels associated with the set of estimated positioning results. The method comprises calculating a set of positioning model capability metrics based on the set of estimated positioning results and the set of verified positioning labels. The method comprises outputting an indication of the calculated set of positioning model capability metrics.

Aspect 2 is the method of aspect 1, wherein the method comprises receiving the set of positioning signals prior to the measurement of the set of positioning signals, wherein calculating the set of estimated positioning results comprises calculating the set of estimated positioning results using the positioning model based on the received measured set of positioning signals.

Aspect 3 is the method of aspect 2, wherein the method comprises applying a set of positioning configurations prior to the reception of the set of positioning signals, wherein receiving the set of positioning signals comprises receiving the set of positioning signals based on the set of positioning configurations.

Aspect 4 is the method of any of aspects 1 to 3, wherein the set of positioning model capability metrics comprises at least one of (a) a positioning model accuracy, (b) a positioning model latency, or (c) a positioning model power consumption.

Aspect 5 is the method of aspect 4, wherein the positioning model accuracy comprises at least one of (a) a percentile of accuracy errors, (b) an average of the accuracy errors, (c) a range of positioning errors, or (d) a confidence interval.

Aspect 6 is the method of any of aspects 1 to 5, wherein the method comprises receiving a request for a set of supported positioning models and associated sets of model capability metrics, wherein outputting the indication of the calculated set of positioning model capability metrics comprises outputting the indication of the calculated set of positioning model capability metrics in response to reception of the request for the set of supported positioning models and associated sets of model capability metrics.

Aspect 7 is the method of aspect 6, wherein the request comprises at least one of (a) a set of positioning configurations, (b) a set of model accuracy levels, (c) a set of model latency levels, or (d) a set of model power consumption levels.

Aspect 8 is the method of any of aspects 1 to 7, wherein outputting the indication of the calculated set of positioning model capability metrics comprises transmitting a set of supported positioning models and associated sets of model capability metrics, wherein the set of supported positioning models comprises the positioning model, wherein the associated sets of model capability metrics comprises the calculated set of positioning model capability metrics.

Aspect 9 is the method of any of aspects 1 to 8, wherein the set of positioning signals comprises a set of sounding reference signals (SRSs) or a set of positioning reference signals (PRSs).

Aspect 10 is the method of any of aspects 1 to 9, wherein the wireless device comprises a user equipment (UE) or a network node.

Aspect 11 is the method of any of aspects 1 to 10, wherein outputting the indication of the calculated set of positioning model capability metrics comprises transmitting, for a network entity, the indication of the calculated set of positioning model capability metrics.

Aspect 12 is the method of any of aspects 1 to 11, wherein outputting the indication of the calculated set of positioning model capability metrics comprises storing, in a memory or a cache, the indication of the calculated set of positioning model capability metrics.

Aspect 13 is a method of wireless communication at a network node, wherein the method comprises transmitting a request for a wireless device to indicate its support for calculating a set of positioning results using a positioning model. The method comprises receiving, based on the request, a response including a set of positioning model capability metrics. The method comprises configuring a set of positioning signals based on the set of positioning model capability metrics.

Aspect 14 is the method aspect 13, wherein the method comprises transmitting a set of positioning configurations based on the configured set of positioning signals.

Aspect 15 is the method of either of aspects 13 or 14, wherein the set of positioning model capability metrics comprises at least one of (a) a positioning model accuracy, (b) a positioning model latency, or (c) a positioning model power consumption.

Aspect 16 is the method of aspect 15, wherein the positioning model accuracy comprises at least one of (a) a percentile of accuracy errors, (b) an average of the accuracy errors, (c) a range of positioning errors, or (d) a confidence interval.

Aspect 17 is the method of any of aspects 13 to 16, wherein the request comprises a set of supported positioning models and associated sets of model capability metrics, wherein the associated sets of model capability metrics comprises the set of positioning model capability metrics.

Aspect 18 is the method of any of aspects 13 to 17, wherein the request comprises at least one of (a) a set of positioning configurations, (b) a set of model accuracy levels, (c) a set of model latency levels, or (d) a set of model power consumption levels.

Aspect 19 is the method of any of aspects 13 to 18, wherein the configured set of positioning signals comprises a set of sounding reference signals (SRSs) or a set of positioning reference signals (PRSs).

Aspect 20 is the method of any of aspects 13 to 19, wherein the network entity comprises a location management function (LMF).

Aspect 21 is the method of any of aspects 13 to 20, wherein the method comprises outputting an indication of the configured set of positioning signals after the configuration of the set of positioning signals based on the set of positioning model capability metrics.

Aspect 22 is the method of aspect 21, wherein outputting the indication of the configured set of positioning signals comprises transmitting, to the wireless device, the indication of the configured set of positioning signals.

Aspect 23 is the method of either of aspects 21 or 22, wherein outputting the indication of the configured set of positioning signals comprises storing, in a memory or a cache, the indication of the configured set of positioning signals.

Aspect 24 is an apparatus for wireless communication, including: a memory; and at least one processor coupled to the memory and, based at least in part on information stored in the memory, the at least one processor is configured to implement any of aspects 1 to 23.

Aspect 25 is the apparatus of aspect 24, further including at least one of an antenna or a transceiver coupled to the at least one processor.

Aspect 26 is an apparatus for wireless communication including means for implementing any of aspects 1 to 23.

Aspect 27 is a computer-readable medium (e.g., a non-transitory computer-readable medium) storing computer executable code, where the code when executed by a processor causes the processor to implement any of aspects 1 to 23.

What is claimed is:

1. An apparatus for wireless communication at a wireless device, comprising:

memory; and at least one processor coupled to the memory and, based at least in part on information stored in the memory, the at least one processor is configured to:

measure a set of positioning signals;

calculate a set of estimated positioning results using a positioning model based on the measured set of positioning signals;

obtain a set of verified positioning labels associated with the set of estimated positioning results;

calculate a set of positioning model capability metrics based on the set of estimated positioning results and the set of verified positioning labels, wherein the set of positioning model capability metrics comprises a latency and an accuracy of the positioning model; and output an indication of the calculated set of positioning model capability metrics based on the set of estimated positioning results and the set of verified positioning labels.

2. The apparatus of claim 1, wherein the at least one processor is further configured to:

receive the set of positioning signals prior to the measurement of the set of positioning signals, wherein, to calculate the set of estimated positioning results, the at least one processor is configured to:

calculate the set of estimated positioning results using the positioning model based on the received measured set of positioning signals.

3. The apparatus of claim 2, wherein the at least one processor is further configured to:

apply a set of positioning configurations prior to a reception of the set of positioning signals, wherein, to receive the set of positioning signals, the at least one processor is configured to:

receive the set of positioning signals based on the set of positioning configurations.

4. The apparatus of claim 1, wherein the set of positioning model capability metrics comprises a positioning model power consumption.

5. The apparatus of claim 1, wherein the positioning model accuracy comprises at least one of:

a percentile of accuracy errors;

an average of the accuracy errors;

a range of positioning errors;

a confidence interval; or any combination thereof.

6. The apparatus of claim 1, wherein the at least one processor is further configured to:

receive a request for a set of supported positioning models and an indication of a latency range and an accuracy range, wherein, to output the indication of the calculated set of positioning model capability metrics, the at least one processor is configured to:

output an indication of a plurality of supported positioning models, wherein each supported positioning model of the plurality of supported positioning models is associated with an associated latency within the latency range and an associated accuracy within the accuracy range in response to a reception of the request for the set of supported positioning models and the indication of the latency range and the accuracy range.

7. The apparatus of claim 6, wherein the request further comprises at least one of:

a set of positioning configurations;

a power consumption range; or any combination thereof, wherein each supported positioning model of the plurality of supported positioning models is further associated with an associated power consumption within the power consumption range or a positioning configuration of the set of positioning configurations.

8. The apparatus of claim 1, further comprising a transceiver coupled to the at least one processor, wherein, to output the indication of the calculated set of positioning model capability metrics, the at least one processor is further configured to:

transmit, via the transceiver, a plurality of supported positioning models and associated sets of model capability metrics, wherein each supported positioning model of the plurality of supported positioning models is associated with an associated set of model capability metrics of the associated sets of model capability metrics, wherein the set of supported positioning models comprises the positioning model, wherein the associated sets of model capability metrics comprise the calculated set of positioning model capability metrics.

9. The apparatus of claim 1, wherein the set of positioning signals comprises a set of sounding reference signals (SRSs) or a set of positioning reference signals (PRSs).

10. The apparatus of claim 1, wherein the wireless device comprises a user equipment (UE) or a network node.

11. The apparatus of claim 1, wherein, to output the indication of the calculated set of positioning model capability metrics, the at least one processor is configured to:

transmit, for a network entity, the indication of the calculated set of positioning model capability metrics based on the set of estimated positioning results and the set of verified positioning labels.

12. The apparatus of claim 1, wherein, to output the indication of the calculated set of positioning model capability metrics, the at least one processor is configured to:

store, in a second memory or a cache, the indication of the calculated set of positioning model capability metrics.

13. An apparatus for wireless communication at a network entity, comprising:

memory; and at least one processor coupled to the memory and, based at least in part on information stored in the memory, the at least one processor is configured to:

transmit a request for a wireless device to indicate its support for calculating a set of positioning results using a positioning model;

receive, based on the request, a response comprising a set of positioning model capability metrics, wherein the set of positioning model capability metrics comprises a latency and an accuracy of the positioning model, wherein the set of positioning model capability metrics are based on a set of estimated positioning results and a set of verified positioning labels; and configure a set of positioning signals based on the set of positioning model capability metrics.

14. The apparatus of claim 13, further comprising a transceiver coupled to the at least one processor, wherein the at least one processor is further configured to:

transmit, via the transceiver, a set of positioning configurations based on the configured set of positioning signals.

15. The apparatus of claim 13, wherein the set of positioning model capability metrics further comprises a positioning model power consumption.

16. The apparatus of claim 13, wherein the positioning model accuracy comprises at least one of:

a percentile of accuracy errors;

an average of the accuracy errors;

a range of positioning errors;

a confidence interval; or any combination thereof.

17. The apparatus of claim 13, wherein the request comprises a second request for a set of supported positioning models and an indication of a latency range and an accuracy range to receive, based on the request, the response comprising the set of positioning model capability metrics, the at least one processor is configured to:

receive the response comprising an indication of a plurality of supported positioning models, wherein each supported positioning model of the plurality of supported positioning models is associated with an associated latency within the latency range and an associated accuracy within the accuracy range.

18. The apparatus of claim 17, wherein the request further comprises at least one of:

a set of positioning configurations;

a power consumption range; or any combination thereof, wherein each supported positioning model of the plurality of supported positioning models is further associated with an associated power consumption within the power consumption range or a positioning configuration of the set of positioning configurations.

19. The apparatus of claim 13, wherein the configured set of positioning signals comprises a set of sounding reference signals (SRSs) or a set of positioning reference signals (PRSs).

20. The apparatus of claim 13, wherein the network entity comprises a location management function (LMF).

21. The apparatus of claim 13, wherein the at least one processor is further configured to:

output an indication of the configured set of positioning signals after the configuration of the set of positioning signals based on the set of positioning model capability metrics.

22. The apparatus of claim 21, wherein, to output the indication of the configured set of positioning signals, the at least one processor is configured to:

transmit, to the wireless device, the indication of the configured set of positioning signals.

23. The apparatus of claim 21, wherein, to output the indication of the configured set of positioning signals, the at least one processor is configured to:

store, in a second memory or a cache, the indication of the configured set of positioning signals.

24. A method of wireless communication at a wireless device, comprising:

measuring a set of positioning signals;

calculating a set of estimated positioning results using a positioning model based on the measured set of positioning signals;

obtaining a set of verified positioning labels associated with the set of estimated positioning results;

calculating a set of positioning model capability metrics based on the set of estimated positioning results and the set of verified positioning labels, wherein the set of positioning model capability metrics comprises a latency and an accuracy of the positioning model; and outputting an indication of the calculated set of positioning model capability metrics based on the set of estimated positioning results and the set of verified positioning labels.

25. The method of claim 24, further comprising:

receiving the set of positioning signals prior to measuring of the set of positioning signals, wherein calculating the set of estimated positioning results comprises:

calculating the set of estimated positioning results using the positioning model based on the received measured set of positioning signals.

26. The method of claim 25, further comprising:

applying a set of positioning configurations prior to receiving of the set of positioning signals, wherein receiving the set of positioning signals comprises:

receiving the set of positioning signals based on the set of positioning configurations.

27. The method of claim 24, further comprising:

transmitting a plurality of supported positioning models and associated sets of model capability metrics, wherein each supported positioning model of the plurality of supported positioning models is associated with an associated set of model capability metrics of the associated sets of model capability metrics, wherein the set of supported positioning models comprises the positioning model, wherein the associated sets of model capability metrics comprise the calculated set of positioning model capability metrics.

28. A method of wireless communication at a network entity, comprising:

transmitting a request for a wireless device to indicate its support for calculating a set of positioning results using a positioning model;

receiving, based on the request, a response comprising a set of positioning model capability metrics, wherein the set of positioning model capability metrics comprises a latency and an accuracy of the positioning model, wherein the set of positioning model capability metrics are based on a set of estimated positioning results and a set of verified positioning labels; and configuring a set of positioning signals based on the set of positioning model capability metrics.

29. The method of claim 28, further comprising:

transmitting a set of positioning configurations based on the configured set of positioning signals.

30. The method of claim 28, further comprising:

outputting an indication of the configured set of positioning signals after configuring the set of positioning signals based on the set of positioning model capability metrics.

* * * * *